United States Patent
Zhang et al.

(10) Patent No.: US 10,749,645 B2
(45) Date of Patent: Aug. 18, 2020

(54) REFERENCE SIGNAL TRANSMITTING METHOD AND DEVICE, AND REFERENCE SIGNAL RECEIVING METHOD AND DEVICE

(71) Applicant: ZTE CORPORATION, Shenzhen (CN)

(72) Inventors: Wen Zhang, Shenzhen (CN); Shuqiang Xia, Shenzhen (CN); Bo Dai, Shenzhen (CN); Qian Dai, Shenzhen (CN); Jing Shi, Shenzhen (CN); Xianghui Han, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 138 days.

(21) Appl. No.: 15/773,264

(22) PCT Filed: Nov. 3, 2016

(86) PCT No.: PCT/CN2016/000599
§ 371 (c)(1),
(2) Date: May 3, 2018

(87) PCT Pub. No.: WO2017/075905
PCT Pub. Date: May 11, 2017

(65) Prior Publication Data
US 2018/0331799 A1    Nov. 15, 2018

(30) Foreign Application Priority Data

Nov. 3, 2015 (CN) .......................... 2015 1 0738019
Nov. 6, 2015 (CN) .......................... 2015 1 0754859

(51) Int. Cl.
H04L 5/00 (2006.01)

(52) U.S. Cl.
CPC ............ *H04L 5/0023* (2013.01); *H04L 5/005* (2013.01); *H04L 5/0051* (2013.01)

(58) Field of Classification Search
None
See application file for complete search history.

(56) References Cited

U.S. PATENT DOCUMENTS

2009/0016342 A1    1/2009 Miyazaki
2010/0195748 A1*   8/2010 Nam .................... H04J 11/0069
                                                        375/260
(Continued)

FOREIGN PATENT DOCUMENTS

CN      1773976 A     5/2006
CN    102685890 A     9/2012
(Continued)

OTHER PUBLICATIONS

International Search Report in international application No. PCT/CN2016/000599, dated Feb. 6, 2017, 3 pgs.
English Translation of the Written Opinion of the International Search Authority in international application No. PCT/CN2016/000599, dated Feb. 6, 2017, 5 pgs.
Supplementary European Search Report in European application No. 16861178.8, dated Oct. 18, 2018, 9 pgs.
(Continued)

*Primary Examiner* — Alex Skripnikov
(74) *Attorney, Agent, or Firm* — Cantor Colburn LLP

(57) ABSTRACT

The present invention provides a reference signal transmitting method and device, and a reference signal receiving method and device. The transmitting method comprises: determining the position of a time-frequency resource for a reference signal in a transmission time interval (TTI) according to a preset manner; and transmitting the reference signal according to the position of the time-frequency resource. The present invention solves the problem in the related art of high processing delay of a user equipment (UE) that occurs because a DMRS is later-positioned, and reduces the processing delay of the UE.

19 Claims, 13 Drawing Sheets a location of a time-frequency resource for sending a reference signal in a Transmission Time Interval (TTI) is determined according to a preset mode — S102 the reference signal is sent according to the location of the time-frequency resource — S104

(56) References Cited

U.S. PATENT DOCUMENTS

| | | | |
|---|---|---|---|
| 2012/0093246 A1 | 4/2012 | Sezginer | |
| 2013/0287064 A1 | 10/2013 | Seo | |
| 2015/0009944 A1* | 1/2015 | Li | H04W 72/082 |
| | | | 370/329 |
| 2015/0139151 A1 | 5/2015 | Seo et al. | |

FOREIGN PATENT DOCUMENTS

| | | |
|---|---|---|
| CN | 103314544 A | 9/2013 |
| CN | 103428777 A | 12/2013 |
| CN | 103944665 A | 7/2014 |
| EP | 2706713 A1 | 3/2014 |

OTHER PUBLICATIONS

Ericsson: "Study of shorter TTI for latency reduction", Oct. 2015, 3GPP TSG-RAN WG2 #91bis; R2-154740 Generation Partnership Project (3GPP), Mobile Competence Centre; 650, Route Des Lucioles; F-06921 Sophia-Antipolis Cedex; Franc, vol. RAN WG2, No. Retrieved from the Internet: URL:http://www.3gpp.org/ftp/Meetings3GPP SYNC/RAN2/Docs/ , 8 pgs.

Huawei et al: "Evaluation on the gains provided by one symbol length TTI", Aug. 2015; 3GPP TSG-RAN WG2 Meeting #91; R2-153851; 3rd Generation Partnership Project (3GPP), Mobile Competence Centre; 650, Route Des Lucioles ; F-06921 Sophia-Antipoli vol. RAN WG2, No. Beijing, China; Retrieved from the Internet: URL:http://www.3gpp.org/ftp/tsg ran/WG2 RL2/TSGR2 91/Docs/, 6 pgs.

* cited by examiner

REFERENCE SIGNAL TRANSMITTING METHOD AND DEVICE, AND REFERENCE SIGNAL RECEIVING METHOD AND DEVICE

TECHNICAL FIELD

The present disclosure relates to the field of communications, and in particular to a method and device for sending and receiving a reference signal.

BACKGROUND

Rapid development of an Internet of Things and a mobile Internet has triggered a wide rise of diverse differentiated services and an explosion of data traffic. As a new generation, a 5th-Generation (5G) technology for mobile communications is to support a new change in a demand by supporting a higher rate of Gigabits per second (Gbps), a massive amount of connections, of around one million connections per square kilometer ($1M/Km^2$), an ultralow delay of about one millisecond (lms), higher reliability, energy efficiency enhanced by a factor of 100, etc., as compared to a 4th-Generation (4G) technology. As a key indicator of the 5G technology, an ultralow delay may have a direct impact on development of a delay-limited service such as an Internet of Vehicles, industrial automation, remote control, a smart grid, etc. Research on 5G delay lowering is under way.

A focus of the delay lowering research is to lower a Transmission Time Interval (TTI for short), desirably from 1 ms at the time being to 0.5 ms, or even a duration of 1~2 Orthogonal Frequency Division Multiplexing (OFDM) symbols, to lower a minimal scheduling time by a factor of two, so as to lower a delay of a single transmission by a factor of two without changing a structure of a frame.

For a system with a TTI lowered to 0.5 ms, adoption of a De Modulation Reference Signal (DMRS) in related art that is located further back or lags behind may lead to a major processing delay for User Equipment (UE). When a TTI is lowered to 0.5 ms or less, the TTI may include no DMRS.

There is no effective solution for an aforementioned problem in related art.

SUMMARY

Embodiments herein provide a method and device for sending and receiving a reference signal, at least capable of avoiding a processing delay for UE caused by a DMRS being located further back or lagging behind in related art.

According to an aspect herein, a method for sending a reference signal contains: determining, according to a preset mode, a location of a time-frequency resource for sending a reference signal in a Transmission Time Interval (TTI); and sending the reference signal according to the location of the time-frequency resource.

The reference signal may correspond to a preset subcarrier in a Physical Resource Block (PRB). The reference signal may correspond to one or more symbols meeting a first preset condition in the TTI on the subcarrier. The first preset condition may contain at least one of the following. The one or more symbols may be determined according to at least one of a port of an antenna sending a Cell-specific Reference Signal (CRS) or an identification of a cell. An index n of the one or more symbols may be no less than m. The m may be an integer no less than zero. The m may be a number of symbols occupied by a Physical Downlink Control Channel (PDCCH). Alternatively, the m may be a preset number of symbols. The index of the one or more symbols may be an index of a symbol in a time slot. The $n \in \{0, 1, 2, 3, 4, 5, 6\}$ for a normal Cyclic Prefix (CP). The $n \in \{0, 1, 2, 3, 4, 5\}$ for an extended CP.

The reference signal may correspond to the subcarrier with an index $k \in \{0, 1, 5, 6, 10, 11\}$. The one or more symbols may be determined according to at least one of the port of the antenna sending the CRS or the identification of the cell in response to at least one of the followings.

The following may apply to $n_{ID}^{cell} \bmod 3=0$, the $n_{ID}^{cell}$ being an identification of the cell in a physical layer.

For p=0, or (p=0 and p=1), the p being the port of the antenna sending the CRS, it may be determined that the reference signal may correspond to the index $n \in \{0, 1, 2, 3, 4, 5, 6\}$ on the subcarrier with the index $k \in \{1, 5, 10, 11\}$ corresponding to the reference signal. It may be determined that the reference signal may correspond to the index $n \in \{1, 2, 3, 5, 6\}$ on the subcarrier with the index $k \in \{0, 6\}$ corresponding to the reference signal. For (p=0, p=1, p=2, and p=3), the p being the port of the antenna sending the CRS, it may be determined that the reference signal may correspond to the index $n \in \{0, 1, 2, 3, 4, 5, 6\}$ on the subcarrier with the index $k \in \{1, 5, 10, 11\}$ corresponding to the reference signal. It may be determined that the reference signal may correspond to the index $n \in \{2, 3, 5, 6\}$ on the subcarrier with the index $k \in \{0, 6\}$ corresponding to the reference signal.

The following may apply to $n_{ID}^{cell} \bmod 3=1$.

For p=0, the p being the port of the antenna sending the CRS, it may be determined that the reference signal may correspond to the index $n \in \{0, 1, 2, 3, 4, 5, 6\}$ on the subcarrier with the index $k \in \{0, 5, 6, 10, 11\}$ corresponding to the reference signal. It may be determined that the reference signal may correspond to the index $n \in \{1, 2, 3, 5, 6\}$ on the subcarrier with the index $k \in \{1\}$ corresponding to the reference signal.

For p=0 and p=1, the p being the port of the antenna sending the CRS, it may be determined that the reference signal may correspond to the index $n \in \{0, 1, 2, 3, 4, 5, 6\}$ on the subcarrier with the index $k \in \{0, 5, 6, 11\}$ corresponding to the reference signal. It may be determined that the reference signal may correspond to the index $n \in \{1, 2, 3, 5, 6\}$ on the subcarrier with the index $k \in \{1, 10\}$ corresponding to the reference signal.

For (p=0, p=1, p=2, and p=3), the p being the port of the antenna sending the CRS, it may be determined that the reference signal may correspond to the index $n \in \{0, 1, 2, 3, 4, 5, 6\}$ on the subcarrier with the index $k \in \{0, 5, 6, 11\}$ corresponding to the reference signal. It may be determined that the reference signal may correspond to the index $n \in \{2, 3, 5, 6\}$ on the subcarrier with the index $k \in \{1, 10\}$ corresponding to the reference signal.

The following may apply to $n_{ID}^{cell} \bmod 3=2$.

For p=0, the p being the port of the antenna sending the CRS, it may be determined that the reference signal may correspond to the index $n \in \{0, 1, 2, 3, 4, 5, 6\}$ on the subcarrier with the index $k \in \{0, 1, 5, 6, 10, 11\}$ corresponding to the reference signal.

For p=0 and p=1, the p being the port of the antenna sending the CRS, it may be determined that the reference signal may correspond to the index $n \in \{0, 1, 2, 3, 4, 5, 6\}$ on the subcarrier with the index $k \in \{0, 1, 6, 10\}$ corresponding to the reference signal. It may be determined that the reference signal may correspond to the index n∈{1, 2, 3, 5, 6} on the subcarrier with the index k∈{5, 11} corresponding to the reference signal.

For (p=0, p=1, p=2, and p=3), the p being the port of the antenna sending the CRS, it may be determined that the reference signal may correspond to the index n∈{0, 1, 2, 3, 4, 5, 6} on the subcarrier with the index k∈{0, 1, 6, 10} corresponding to the reference signal. It may be determined that the reference signal may correspond to the index n∈{2, 3, 5, 6} on the subcarrier with the index k∈{5, 11} corresponding to the reference signal, Subcarriers in a PRB may be given indices 0 to 11 in ascending frequencies.

The reference signal may correspond to the subcarrier with an index k∈{1, 4, 7, 10}. The one or more symbols on the subcarrier may be determined according to at least one of the port of the antenna sending the CRS or the identification of the cell in response to at least one of the followings.

For $n_{ID}^{cell}$ mod 3=0 or $n_{ID}^{cell}$ mod 3=2, it may be determined that the subcarrier with the index k∈{1, 4, 7, 10} may correspond to the index n∈{0, 1, 2, 3, 4, 5}.

The following may apply to $n_{ID}^{cell}$ mod 3=1.

For p=0, the p being the port of the antenna sending the CRS, it may be determined that the reference signal may correspond to the index n∈{1, 2, 4, 5} on the subcarrier with the index k∈{1, 7} corresponding to the reference signal. It may be determined that the reference signal may correspond to the index n∈{0, 1, 2, 3, 4, 5} on the subcarrier with the index k∈{4, 10} corresponding to the reference signal.

For p=0 and p=1, the p being the port of the antenna sending the CRS, it may be determined that the reference signal may correspond to the index n∈{1, 2, 4, 5} on the subcarrier with the index k∈{1, 4, 7, 10} corresponding to the reference signal.

For (p=0, p=1, p=2, and p=3), the p being the port of the antenna sending the CRS, it may be determined that the reference signal may correspond to the index n∈{2, 4, 5} on the subcarrier with the index k∈{1, 4, 7, 10} corresponding to the reference signal.

The reference signal may correspond to the subcarrier with an index k∈{2, 5, 8, 11}. The one or more symbols on the subcarrier may be determined according to at least one of the port of the antenna sending the CRS or the identification of the cell in response to at least one of the followings.

For $n_{ID}^{cell}$ mod 3=0 or $n_{ID}^{cell}$ mod 3=1, it may be determined that the reference signal may correspond to the index n∈{0, 1, 2, 3, 4, 5} on the subcarrier with the index k∈{2, 5, 8, 11} corresponding to the reference signal, The following may apply to $n_{ID}^{cell}$ mod 3=2.

For p=0, the p being the port of the antenna sending the CRS, it may be determined that the reference signal may correspond to the index n∈{1, 2, 4, 5} on the subcarrier with the index k∈{2, 8} corresponding to the reference signal. It may be determined that the reference signal may correspond to the index n∈{0, 1, 2, 3, 4, 5} on the subcarrier with the index k∈{4, 10} corresponding to the reference signal.

For p=0 and p=1, the p being the port of the antenna sending the CRS, it may be determined that the reference signal may correspond to the index n∈{1, 2, 4, 5} on the subcarrier with the index k∈{2, 5, 8, 11} corresponding to the reference signal.

For (p=0, p=1, p=2, and p=3), the p being the port of the antenna sending the CRS, it may be determined that the reference signal may correspond to the index n∈{2, 4, 5} on the subcarrier with the index k∈{2, 5, 8, 11} corresponding to the reference signal.

The reference signal may correspond to one or more symbols with minimal indices meeting the first preset condition in the TTI.

The location of the time-frequency resource for sending the reference signal in the TTI may be determined according to the preset mode as follows. The reference signal may correspond to one or more symbols meeting a second preset condition in the TTI. The reference signal may correspond to a subcarrier on the one or more symbols that is determined according to at least one of a port of an antenna sending a Cell-specific Reference Signal (CRS) or an identification of a cell. The second preset condition may be as follows. The one or more symbols may be determined according to at least one of the port of the antenna sending the CRS or the identification of the cell. An index n of the one or more symbols may be no less than m. The m may be an integer no less than zero. The m may be a number of symbols occupied by a Physical Downlink Control Channel (PDCCH). Alternatively, the m may be a preset number of symbols. The index of the one or more symbols may be an index of a symbol in a time slot. The n∈{0, 1, 2, 3, 4, 5, 6} for a normal Cyclic Prefix (CP). The n∈{0, 1, 2, 3, 4, 5} for an extended CP.

The one or more symbols may be determined according to at least one of the port of the antenna sending the CRS or the identification of the cell in response to at least one of the followings.

The following may apply to $n_{ID}^{cell}$ mod 3=0.

For p=0, the p being the port of the antenna sending the CRS, the reference signal may correspond to the subcarrier with an index k∈{1, 2, 3, 4, 5, 7, 8, 9, 10, 11}.

For (p=0 and p=1), or (p=0, p=1, p=2, and p=3), the p being the port of the antenna sending the CRS, the reference signal may correspond to the subcarrier with the index k∈{1, 2, 4, 5, 7, 8, 10, 11} in a Physical Resource Block (PRB).

The following may apply to $n_{ID}^{cell}$ mod 3=1.

For p=0, the p being the port of the antenna sending the CRS, the reference signal may correspond to the subcarrier with the index k∈{0, 2, 3, 4, 5, 6, 8, 9, 10, 11}.

For (p=0 and p=1), or (p=0, p=1, p=2, and p=3), the p being the port of the antenna sending the CRS, the reference signal may correspond to the subcarrier with the index k∈{0, 2, 3, 5, 6, 8, 9, 11}.

The following may apply to $n_{ID}^{cell}$ mod 3=2.

For p=0, the p being the port of the antenna sending the CRS, the reference signal may correspond to the subcarrier with the index k∈{0, 1, 3, 4, 5, 6, 7, 9, 10, 11}.

For (p=0 and p=1), or (p=0, p=1, p=2, and p=3), the p being the port of the antenna sending the CRS, the reference signal may correspond to the subcarrier with the index k∈{0, 1, 3, 4, 6, 7, 9, 10}, Subcarriers in a PRB may be given indices 0 to 11 in ascending frequencies.

The reference signal may correspond to one or more symbols with minimal indices meeting the second preset condition in the TTI.

In the TTI, the time-frequency resource may correspond to a symbol with an index n∈{2, 3, 5, 6} for a normal Cyclic Prefix (CP). The time-frequency resource may correspond to the symbol with the index n∈{2, 4, 5} for an extended CP.

For the TTI of a duration of a time slot, for a normal Cyclic Prefix (CP), the time-frequency resource may correspond to a symbol with an index n∈{2, 3}. The time-frequency resource may correspond to a subcarrier with an index k∈{0, 1, 5, 6, 10, 11} in a Physical Resource Block (PRB).

Symbols in the TTI may be given indices 0, 1, 2, 3, 4, 5, and 6. Subcarriers in a PRB may be given indices 0 to 11 in ascending frequencies.

The reference signal may correspond to one or more symbols with minimal indices in the TTI.

A TTI may be adjacent to one or more symbols in a neighbor TTI.

The one or more symbols in the neighbor TTI may contain the reference signal.

Frequency resource allocation in the TTI may be done at a granularity of 12×y subcarriers. The y may be an integer greater than 1.

The reference signal may occupy 1, 2, 3, or 4 of 12 Resource Elements (RE) in a Physical Resource Block (PRB) on a symbol containing the reference signal.

The reference signal may occupy consecutive REs in a frequency domain.

According to an aspect herein, a method for receiving a reference signal contains: receiving, by User Equipment (UE), a reference signal sent by a Base Station (BS) according to a location of a time-frequency resource. The BS may determine the location of the time-frequency resource for sending the reference signal in a Transmission Time Interval (TTI) according to a preset mode.

The reference signal may correspond to a preset subcarrier. The reference signal may correspond to one or more symbols meeting a first preset condition in the TTI on the subcarrier. The first preset condition may contain at least one of the following. The one or more symbols may be determined according to at least one of a port of an antenna sending a Cell-specific Reference Signal (CRS) or an identification of a cell. An index n of the one or more symbols may be no less than m. The m may be an integer no less than zero. The m may be a number of symbols occupied by a Physical Downlink Control Channel (PDCCH). Alternatively, the m may be a preset number of symbols. The index of the one or more symbols may be an index of a symbol in a time slot. The n∈{0, 1, 2, 3, 4, 5, 6} for a normal Cyclic Prefix (CP). The n∈{0, 1, 2, 3, 4, 5} for an extended CP.

The location of the time-frequency resource for sending the reference signal in the TTI may be determined according to the preset mode as follows. The reference signal may correspond to one or more symbols meeting a second preset condition in the TTI. The reference signal may correspond to a subcarrier on the one or more symbols that is determined according to at least one of a port of an antenna sending a Cell-specific Reference Signal (CRS) or an identification of a cell. The second preset condition may contain at least one of the follow. An index n of the one or more symbols may be no less than m. The m may be an integer no less than zero. The m may be a number of symbols occupied by a Physical Downlink Control Channel (PDCCH). Alternatively, the m may be a preset number of symbols. The index of the one or more symbols may be an index of a symbol in a time slot. The n∈{0, 1, 2, 3, 4, 5, 6} for a normal Cyclic Prefix (CP). The n∈{0, 1, 2, 3, 4, 5} for an extended CP.

In the TTI, the time-frequency resource may correspond to a symbol with an index n∈{2, 3, 5, 6} for a normal Cyclic Prefix (CP). The time-frequency resource may correspond to the symbol with the index n∈{2, 4, 5} for an extended CP.

According to an aspect herein, a device for sending a reference signal applies to a Base Station (BS). The device contains: a determining module arranged for determining, according to a preset mode, a location of a time-frequency resource for sending a reference signal in a Transmission Time Interval (TTI); and a sending module arranged for sending the reference signal according to the location of the time-frequency resource.

According to an aspect herein, a device for receiving a reference signal applies to User Equipment (UE). The device contains: a receiving module arranged for receiving a reference signal sent by a Base Station (BS). A location of a time-frequency resource for sending the reference signal in a Transmission Time Interval (TTI) is determined according to a preset mode.

A computer-readable storage medium according to an embodiment herein has stored therein instructions that when executed by a processor, cause the processor to perform steps as follows.

A location of a time-frequency resource for sending a reference signal in a Transmission Time Interval (TTI) is determined according to a preset mode.

The reference signal is sent according to the location of the time-frequency resource.

With at least one embodiment herein, a location of a time-frequency resource for sending the reference signal in a TTI is determined according to a preset mode. The reference signal is sent according to the location of the time-frequency resource. Accordingly, a location of the DMRS may be altered, lowering a processing delay for UE, avoiding a major processing delay for UE caused by a DMRS being located further back or lagging behind in related art.

BRIEF DESCRIPTION OF THE DRAWINGS

A drawing illustrated herein is provided for further understanding of an embodiment herein, and forms a part herein. An illustrative embodiment herein and description thereof are for explaining the present disclosure, and may not form improper limitations to the present disclosure.

DETAILED DESCRIPTION

Embodiments herein are elaborated below with reference to the drawings. Embodiments herein and features thereof may be combined with each other as long as no conflict results from the combination.

Terms such as "first", "second", "third" and/or the like used herein denote no specific order, but are for telling apart similar objects.

Figure 1:
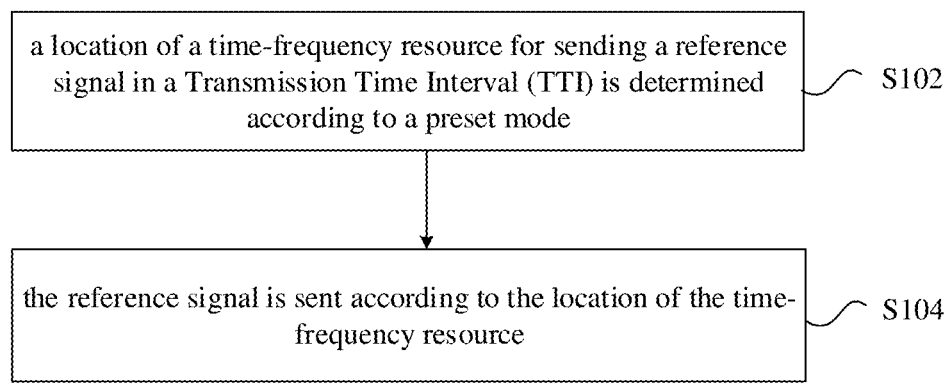
FIG. 1 is a flowchart of a method for sending a reference signal according to an embodiment herein.

A method for sending a reference signal (RS) according to an embodiment herein is provided. FIG. 1 is a flowchart of a method for sending a reference signal according to an embodiment herein. As shown in FIG. 1, the flow contains steps as follows.

In step S102, a location of a time-frequency resource for sending a reference signal in a Transmission Time Interval (TTI) is determined according to a preset mode.

In step S104, the reference signal is sent according to the location of the time-frequency resource.

With the steps S102 to S104, a location of a time-frequency resource for sending a reference signal in a TTI is determined according to a preset mode. The reference signal is sent according to the location of the time-frequency resource. Accordingly, a location of the DMRS may be altered, lowering a processing delay for UE, avoiding a major processing delay for UE caused by a DMRS being located further back or lagging behind in related art.

It is exemplified below how the location of the DMRS is determined according to the preset mode with reference to implementation herein.

In step S102, the location of the time-frequency resource for sending the reference signal in the TTI may be determined according to the preset mode as follows. A subcarrier corresponding to the time-frequency resource may be preset. That is, the reference signal may correspond to a preset subcarrier. The reference signal may correspond to one or more symbols meeting a first preset condition in the TTI on the subcarrier.

The first preset condition may include at least one mode as follows.

In a mode 1, the one or more symbols may be determined according to at least one of a port of an antenna sending a Cell-specific Reference Signal (CRS) or an identification of a cell.

In a mode 2, an index n of the one or more symbols may be no less than m. The m may be an integer no less than zero. The m may be a number of symbols occupied by a Physical Downlink Control Channel (PDCCH). Alternatively, the m may be a preset number of symbols. The index of the one or more symbols may be an index of a symbol in a time slot. The n∈{0, 1, 2, 3, 4, 5, 6} for a normal Cyclic Prefix (CP). The n∈{0, 1, 2, 3, 4, 5} for an extended CP.

Based on the location in the time-frequency domain in the preset mode, and the modes 1 and 2, there may be multiple subcarrier indices k corresponding to the location of the time-frequency resource. The present disclosure may be exemplified below with reference to a localized implementation herein.

The reference signal may correspond to the subcarrier with an index k∈{0, 1, 5, 6, 10, 11} in a Physical Resource Block (PRB).

The one or more symbols on the subcarrier may be determined according to at least one of the port of the antenna sending the CRS or the identification of the cell in at least one mode as follows.

$n_{ID}^{cell}$ mod 3=0.

The p may be the port of the antenna sending the CRS. For p=0, or for (p=0 and p=1), the reference signal may correspond to the index n∈{0, 1, 2, 3, 4, 5, 6} on the subcarrier with the index k∈{1, 5, 10, 11} corresponding to the reference signal. The reference signal may correspond to the index n∈{1, 2, 3, 5, 6} on the subcarrier with the index k∈{0, 6} corresponding to the reference signal.

For p=0, p=1, p=2, and p=3, the reference signal may correspond to the index n∈{0, 1, 2, 3, 4, 5, 6} on the subcarrier with the index k∈{1, 5, 10, 11} corresponding to the reference signal. The reference signal may correspond to the index n∈{2, 3, 5, 6} on the subcarrier with the index k∈{0, 6} corresponding to the reference signal.

For p=0, or for (p=0 and p=1), the CRS may be sent at the port 0 of the antenna, or at the ports 0 and 1 of the antenna. For p=0, p=1, p=2, and p=3, the CRS may be sent at the ports 0, 1, 2, and 3 of the antenna. Likewise, a port number of the antenna for sending the CRS mentioned below may have a similar explanation.

$n_{ID}^{cell}$ mod 3=1.

The p may be the port of the antenna sending the CRS. For p=0, the reference signal may correspond to the index n∈{0, 1, 2, 3, 4, 5, 6} on the subcarrier with the index k∈{0, 5, 6, 10, 11} corresponding to the reference signal. The reference signal may correspond to the index n∈{1, 2, 3, 5, 6} on the subcarrier with the index k∈{1} corresponding to the reference signal.

For p=0 and p=1, the reference signal may correspond to the index n∈{0, 1, 2, 3, 4, 5, 6} on the subcarrier with the index k∈{0, 5, 6, 11} corresponding to the reference signal. The reference signal may correspond to the index n∈{1, 2, 3, 5, 6} on the subcarrier with the index k∈{1, 10} corresponding to the reference signal.

For p=0, p=1, p=2, and p=3, the reference signal may correspond to the index n∈{0, 1, 2, 3, 4, 5, 6} on the subcarrier with the index k∈{0, 5, 6, 11} corresponding to the reference signal. The reference signal may correspond to the index n∈{2, 3, 5, 6} on the subcarrier with the index k∈{1, 10} corresponding to the reference signal.

$n_{ID}^{cell}$ mod 3=2.

The p may be the port of the antenna sending the CRS. For p=0, the reference signal may correspond to the index n∈{0, 1, 2, 3, 4, 5, 6} on the subcarrier with the index k∈{0, 1, 5, 6, 10, 11} corresponding to the reference signal.

For p=0 and p=1, the reference signal may correspond to the index n∈{0, 1, 2, 3, 4, 5, 6} on the subcarrier with the index k∈{0, 1, 6, 10} corresponding to the reference signal. The reference signal may correspond to the index n∈{1, 2, 3, 5, 6} on the subcarrier with the index k∈{5, 11} corresponding to the reference signal.

For p=0, p=1, p=2, and p=3, the reference signal may correspond to the index n∈{0, 1, 2, 3, 4, 5, 6} on the subcarrier with the index k∈{0, 1, 6, 10} corresponding to the reference signal. The reference signal may correspond to the index n∈{2, 3, 5, 6} on the subcarrier with the index k∈{5, 11} corresponding to the reference signal.

Subcarriers in a PRB may be given indices 0 to 11 in ascending frequencies.

The reference signal may correspond to the subcarrier with an index k∈{1, 4, 7, 10} in a PRB.

The one or more symbols on the subcarrier may be determined according to at least one of the port of the antenna sending the CRS or the identification of the cell in at least one mode as follows.

$n_{ID}^{cell}$ mod 3=0 or $n_{ID}^{cell}$ mod 3=2.

The subcarrier with the index k∈{1, 4, 7, 10} may correspond to the index n∈{0, 1, 2, 3, 4, 5}.

$n_{ID}^{cell}$ mod 3=1.

The p may be the port of the antenna sending the CRS. For p=0, the reference signal may correspond to the index n∈{1, 2, 4, 5} on the subcarrier with the index k∈{1, 7} corresponding to the reference signal. The reference signal may correspond to the index n∈{0, 1, 2, 3, 4, 5} on the subcarrier with the index k∈{4, 10} corresponding to the reference signal.

For p=0 and p=1, the reference signal may correspond to the index n∈{1, 2, 4, 5} on the subcarrier with the index k∈{1, 4, 7, 10} corresponding to the reference signal.

For p=0, p=1, p=2, and p=3, the reference signal may correspond to the index n∈{2, 4, 5} on the subcarrier with the index k∈{1, 4, 7, 10} corresponding to the reference signal.

Subcarriers in a PRB may be given indices 0 to 11 in ascending frequencies.

The reference signal may correspond to the subcarrier with an index k∈{2, 5, 8, 11} in a PRB.

The one or more symbols on the subcarrier may be determined according to at least one of the port of the antenna sending the CRS or the identification of the cell in at least one mode as follows.

For $n_{ID}^{cell}$ mod 3=0 or $n_{ID}^{cell}$ mod 3=1, the reference signal may correspond to the index n∈{0, 1, 2, 3, 4, 5} on the subcarrier with the index k∈{2, 5, 8, 11} corresponding to the reference signal.

$n_{ID}^{cell}$ mod 3=2.

The p may be the port of the antenna sending the CRS. For p=0, the reference signal may correspond to the index n∈{1, 2, 4, 5} on the subcarrier with the index k∈{2, 8} corresponding to the reference signal. The reference signal may correspond to the index n∈{0, 1, 2, 3, 4, 5} on the subcarrier with the index k∈{4, 10} corresponding to the reference signal.

For p=0 and p=1, the reference signal may correspond to the index n∈{1, 2, 4, 5} on the subcarrier with the index k∈{2, 5, 8, 11} corresponding to the reference signal.

For p=0, p=1, p=2, and p=3, the reference signal may correspond to the index n∈{2, 4, 5} on the subcarrier with the index k∈{2, 5, 8, 11} corresponding to the reference signal.

Subcarriers in a PRB may be given indices 0 to 11 in ascending frequencies.

The three implementations aforementioned are in accordance to embodiments herein and may not limit the present disclosure.

The reference signal may correspond to one or more symbols with minimal indices meeting the first preset condition in the TTI.

In step S102, the location of the time-frequency resource for sending the reference signal in the TTI may be determined according to the preset mode as follows. The reference signal may correspond to one or more symbols meeting a second preset condition in the TTI. The reference signal may correspond to a subcarrier on the one or more symbols. The subcarrier may be determined according to at least one of a port of an antenna sending a CRS or an identification of a cell.

The second preset condition may include at least one of the following. The one or more symbols may be determined according to at least one of the port of the antenna sending the CRS or the identification of the cell. An index n of the one or more symbols may be no less than m. The m may be an integer no less than zero.

The m may be a number of symbols occupied by a PDCCH. Alternatively, the m may be a preset number of symbols. If the reference signal corresponds to the subcarrier with an index k∈{2, 5, 8, 11}, then the n∈{0, 1, 2, 3, 4, 5, 6} for a normal CP. The n∈{0, 1, 2, 3, 4, 5, 6} for an extended CP.

Based on the second preset condition, the location of the one or more symbols in the frequency domain may be determined according to at least one of the port of the antenna sending the CRS or the identification of the cell in at least one mode as follows.

$n_{ID}^{cell}$ mod 3=0.

The p may be the port of the antenna sending the CRS. For p=0, the reference signal may correspond to the subcarrier with an index k∈{1, 2, 3, 4, 5, 7, 8, 9, 10, 11}.

For (p=0 and p=1), or (p=0, p=1, p=2, and p=3), the reference signal may correspond to the subcarrier with the index k∈{1, 2, 4, 5, 7, 8, 10, 11}.

$n_{ID}^{cell}$ mod 3=1.

The p may be the port of the antenna sending the CRS. For p=0, the reference signal may correspond to the subcarrier with the index k∈{0, 2, 3, 4, 5, 6, 8, 9, 10, 11}.

For (p=0 and p=1), or (p=0, p=1, p=2, and p=3), the reference signal may correspond to the subcarrier with the index k∈{0, 2, 3, 5, 6, 8, 9, 11}.

$n_{ID}^{cell}$ mod 3=2.

The p may be the port of the antenna sending the CRS. For p=0, the reference signal may correspond to the subcarrier with the index k∈{0, 1, 3, 4, 5, 6, 7, 9, 10, 11}.

For (p=0 and p=1), or (p=0, p=1, p=2, and p=3), the reference signal may correspond to the subcarrier with the index k∈{0, 1, 3, 4, 6, 7, 9, 10}.

The three implementations aforementioned are in accordance to embodiments herein and may not limit the present disclosure.

The reference signal may correspond to one or more symbols with minimal indices meeting the second preset condition in the TTI.

In steps S102 and S104, A TTI may be adjacent to one or more symbols in a neighbor TTI. The one or more symbols in the neighbor TTI may contain the reference signal. The time-frequency resource may correspond to a symbol with an index n∈{2, 3, 5, 6} for a normal CP. The time-frequency resource may correspond to the symbol with the index n∈{2, 4, 5} for an extended CP. The reference signal may correspond to one or more symbols with minimal indices.

For the TTI of a duration of a time slot, for a normal CP, the time-frequency resource may correspond to a symbol with an index n∈{2, 3}. The time-frequency resource may correspond to a subcarrier with an index k∈{0, 1, 5, 6, 10, 11} in a PRB. Symbols in the TTI may be given indices 0, 1, 2, 3, 4, 5, and 6. Subcarriers in a PRB may be given indices 0 to 11 in ascending frequencies.

In steps S102 and S104, frequency resource allocation in the TTI may be done at a granularity of 12×y subcarriers. The y may be an integer greater than 1. The reference signal may occupy 1, 2, 3, or 4 of 12 Resource Elements (RE) contained in a PRB on a symbol containing the reference signal. The reference signal may occupy REs that are consecutive in the frequency domain.

An aforementioned embodiment herein may apply to a Base Station (BS). An embodiment herein illustrated below may apply to User Equipment (UE) receiving the reference signal.

A method for receiving a reference signal according to an embodiment herein is provided. The method contains the step(s) as follows. UE receives a reference signal sent by a BS. A location of a time-frequency resource for sending the reference signal in a TTI is determined according to a preset mode.

The UE may receive the reference signal sent by the BS according to the location of the time-frequency resource. The BS may determine the location of the time-frequency resource for sending the reference signal in the TTI according to the preset mode.

The reference signal may correspond to a preset subcarrier. The reference signal may correspond to one or more symbols meeting a first preset condition in the TTI on the subcarrier.

The first preset condition may include at least one mode as follows.

In a mode 1, the one or more symbols may be determined according to at least one of a port of an antenna sending a Cell-specific Reference Signal (CRS) or an identification of a cell.

In a mode 2, an index n of the one or more symbols may be no less than m. The m may be an integer no less than zero. The m may be a number of symbols occupied by a Physical Downlink Control Channel (PDCCH). Alternatively, the m may be a preset number of symbols. The index of the one or more symbols may be an index of a symbol in a time slot. The n∈{0, 1, 2, 3, 4, 5, 6} for a normal Cyclic Prefix (CP). The n∈{0, 1, 2, 3, 4, 5} for an extended CP.

Based on the location in the time-frequency domain in the preset mode, and the modes 1 and 2, there may be multiple subcarrier indices k corresponding to the location of the time-frequency resource. The present disclosure may be exemplified below with reference to a localized implementation herein.

The reference signal may correspond to the subcarrier with an index k∈{0, 1, 5, 6, 10, 11}.

The one or more symbols on the subcarrier may be determined according to at least one of the port of the antenna sending the CRS or the identification of the cell in at least one mode as follows.

$n_{ID}^{cell}$ mod 3=0.

The p may be the port of the antenna sending the CRS. For p=0, or for (p=0 and p=1), the reference signal may correspond to the index n∈{0, 1, 2, 3, 4, 5, 6} on the subcarrier with the index k∈{1, 5, 10, 11} corresponding to the reference signal. The reference signal may correspond to the index n∈{1, 2, 3, 5, 6} on the subcarrier with the index k∈{0, 6} corresponding to the reference signal.

For p=0, p=1, p=2, and p=3, the reference signal may correspond to the index n∈{0, 1, 2, 3, 4, 5, 6} on the subcarrier with the index k∈{1, 5, 10, 11} corresponding to the reference signal. The reference signal may correspond to the index n∈{2, 3, 5, 6} on the subcarrier with the index k∈{0, 6} corresponding to the reference signal.

For p=0, or for (p=0 and p=1), the CRS may be sent at the port 0 of the antenna, or at the ports 0 and 1 of the antenna. For p=0, p=1, p=2, and p=3, the CRS may be sent at the ports 0, 1, 2, and 3 of the antenna. Likewise, a port number of the antenna for sending the CRS mentioned below may have a similar explanation.

$n_{ID}^{cell}$ mod 3=1.

The p may be the port of the antenna sending the CRS. For p=0, the reference signal may correspond to the index n∈{0, 1, 2, 3, 4, 5, 6} on the subcarrier with the index k∈{0, 5, 6, 10, 11} corresponding to the reference signal. The reference signal may correspond to the index n∈{1, 2, 3, 5, 6} on the subcarrier with the index k∈{1} corresponding to the reference signal.

For p=0 and p=1, the reference signal may correspond to the index n∈{0, 1, 2, 3, 4, 5, 6} on the subcarrier with the index k∈{0, 5, 6, 11} corresponding to the reference signal. The reference signal may correspond to the index n∈{1, 2, 3, 5, 6} on the subcarrier with the index k∈{1, 10} corresponding to the reference signal.

For p=0, p=1, p=2, and p=3, the reference signal may correspond to the index n∈{0, 1, 2, 3, 4, 5, 6} on the subcarrier with the index k∈{0, 5, 6, 11} corresponding to the reference signal. The reference signal may correspond to the index n∈{2, 3, 5, 6} on the subcarrier with the index k∈{1, 10} corresponding to the reference signal.

$n_{ID}^{cell}$ mod 3=2.

The p may be the port of the antenna sending the CRS. For p=0, the reference signal may correspond to the index n∈{0, 1, 2, 3, 4, 5, 6} on the subcarrier with the index k∈{0, 1, 5, 6, 10, 11} corresponding to the reference signal.

For p=0 and p=1, the reference signal may correspond to the index n∈{0, 1, 2, 3, 4, 5, 6} on the subcarrier with the index k∈{0, 1, 6, 10} corresponding to the reference signal. The reference signal may correspond to the index n∈{1, 2, 3, 5, 6} on the subcarrier with the index k∈{5, 11} corresponding to the reference signal.

For p=0, p=1, p=2, and p=3, the reference signal may correspond to the index n∈{0, 1, 2, 3, 4, 5, 6} on the subcarrier with the index k∈{0, 1, 6, 10} corresponding to the reference signal. The reference signal may correspond to the index n∈{2, 3, 5, 6} on the subcarrier with the index k∈{5, 11} corresponding to the reference signal.

The reference signal may correspond to the subcarrier with an index k∈{1, 4, 7, 10}.

The one or more symbols on the subcarrier may be determined according to at least one of the port of the antenna sending the CRS or the identification of the cell in at least one mode as follows.

$n_{ID}^{cell}$ mod 3=0 or $n_{ID}^{cell}$ mod 3=2.

The subcarrier with the index k∈{1, 4, 7, 10} may correspond to the index n∈{0, 1, 2, 3, 4, 5}.

$n_{ID}^{cell}$ mod 3=1.

The p may be the port of the antenna sending the CRS. For p=0, the reference signal may correspond to the index n∈{1, 2, 4, 5} on the subcarrier with the index k∈{1, 7} corresponding to the reference signal. The reference signal may correspond to the index n∈{0, 1, 2, 3, 4, 5} on the subcarrier with the index k∈{4, 10} corresponding to the reference signal.

For p=0 and p=1, the reference signal may correspond to the index n∈{1, 2, 4, 5} on the subcarrier with the index k∈{1, 4, 7, 10} corresponding to the reference signal.

For p=0, p=1, p=2, and p=3, the reference signal may correspond to the index n∈{2, 4, 5} on the subcarrier with the index k∈{1, 4, 7, 10} corresponding to the reference signal.

The reference signal may correspond to the subcarrier with an index k∈{2, 5, 8, 11}.

The one or more symbols on the subcarrier may be determined according to at least one of the port of the antenna sending the CRS or the identification of the cell in at least one mode as follows.

For $n_{ID}^{cell}$ mod 3=0 or $n_{ID}^{cell}$ mod 3=1, the reference signal may correspond to the index n∈{0, 1, 2, 3, 4, 5} on the subcarrier with the index k∈{2, 5, 8, 11} corresponding to the reference signal.

$n_{ID}^{cell}$ mod 3=2.

The p may be the port of the antenna sending the CRS. For p=0, the reference signal may correspond to the index n∈{1, 2, 4, 5} on the subcarrier with the index k∈{2, 8} corresponding to the reference signal. The reference signal may correspond to the index n∈{0, 1, 2, 3, 4, 5} on the subcarrier with the index k∈{4, 10} corresponding to the reference signal.

For p=0 and p=1, the reference signal may correspond to the index n∈{1, 2, 4, 5} on the subcarrier with the index k∈{2, 5, 8, 11} corresponding to the reference signal.

For p=0, p=1, p=2, and p=3, the reference signal may correspond to the index n∈{2, 4, 5} on the subcarrier with the index k∈{2, 5, 8, 11} corresponding to the reference signal.

The three implementations aforementioned are in accordance to embodiments herein and may not limit the present disclosure.

The reference signal may correspond to one or more symbols with minimal indices meeting the first preset condition in the TTI.

In step S102, the location of the time-frequency resource for sending the reference signal in the TTI may be determined according to the preset mode as follows. The reference signal may correspond to one or more symbols meeting a second preset condition in the TTI. The reference signal may correspond to a subcarrier on the one or more symbols. The subcarrier may be determined according to at least one of a port of an antenna sending a CRS or an identification of a cell.

The second preset condition may include at least one of the following. The one or more symbols may be determined according to at least one of the port of the antenna sending the CRS or the identification of the cell. An index n of the one or more symbols may be no less than m. The m may be an integer no less than zero. The m may be a number of symbols occupied by a PDCCH. Alternatively, the m may be a preset number of symbols. If the reference signal corresponds to the subcarrier with an index k∈{2, 5, 8, 11}, then the n∈{0, 1, 2, 3, 4, 5, 6} for a normal CP. The n∈{0, 1, 2, 3, 4, 5, 6} for an extended CP.

Based on the second preset condition, the location of the one or more symbols in the frequency domain may be determined according to at least one of the port of the antenna sending the CRS or the identification of the cell in at least one mode as follows.

$n_{ID}^{cell}$ mod 3=0.

The p may be the port of the antenna sending the CRS. For p=0, the reference signal may correspond to the subcarrier with an index k∈{1, 2, 3, 4, 5, 7, 8, 9, 10, 11}.

For (p=0 and p=1), or (p=0, p=1, p=2, and p=3), the reference signal may correspond to the subcarrier with the index k∈{1, 2, 4, 5, 7, 8, 10, 11}.

$n_{ID}^{cell}$ mod 3=1.

The p may be the port of the antenna sending the CRS. For p=0, the reference signal may correspond to the subcarrier with the index k∈{0, 2, 3, 4, 5, 6, 8, 9, 10, 11}.

For (p=0 and p=1), or (p=0, p=1, p=2, and p=3), the reference signal may correspond to the subcarrier with the index k∈{0, 2, 3, 5, 6, 8, 9, 11}.

$n_{ID}^{cell}$ mod 3=2.

The p may be the port of the antenna sending the CRS. For p=0, the reference signal may correspond to the subcarrier with the index k∈{0, 1, 3, 4, 5, 6, 7, 9, 10, 11}.

For (p=0 and p=1), or (p=0, p=1, p=2, and p=3), the reference signal may correspond to the subcarrier with the index k∈{0, 1, 3, 4, 6, 7, 9, 10}.

The three implementations aforementioned are in accordance to embodiments herein and may not limit the present disclosure.

The reference signal may correspond to one or more symbols with minimal indices meeting the second preset condition in the TTI.

In steps S102 and S104, a TTI may be adjacent to one or more symbols in a neighbor TTI. The one or more symbols in the neighbor TTI may contain the reference signal. The time-frequency resource may correspond to a symbol with an index n∈{2, 3, 5, 6} for a normal CP. The time-frequency resource may correspond to the symbol with the index n∈{2, 4, 5} for an extended CP. The reference signal may correspond to one or more symbols with minimal indices.

In steps S102 and S104, frequency resource allocation in the TTI may be done at a granularity of 12×y subcarriers. The y may be an integer greater than 1. The reference signal may occupy 1, 2, 3, or 4 of 12 Resource Elements (RE) contained in a PRB on a symbol containing the reference signal. The reference signal may occupy REs that are consecutive in the frequency domain.

With the description herein, those skilled in the art can clearly understand that embodiments herein can be implemented by hardware, or often better, by software plus a necessary general hardware platform. Based on such an understanding, the essential part or the part contributing to prior art of a technical solution herein may be embodied in form of a software product. The software product may be stored in a volatile or nonvolatile memory medium, such as a Read Only Memory (ROM), a Random Access Memory (RAM), a magnetic disk, a CD, and/or the like, that includes a number of instructions that allow terminal equipment, such as a mobile phone, a computer, a server, a network device, etc., to execute the method according to an embodiment herein.

A device for sending a reference signal according to an embodiment herein is provided. The device is arranged for implementing an embodiment as described above, which will not be repeated. A term "module" may refer to a combination of software and/or hardware capable of implementing a preset function. The device described in an embodiment below may be implemented by software, hardware, a combination of software and hardware, etc.

Figure 2:
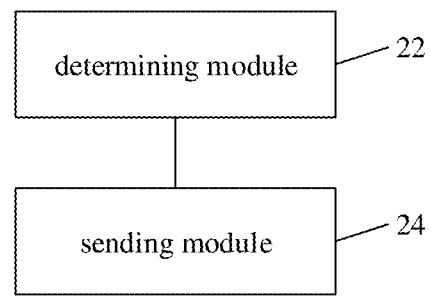
FIG. 2 is a diagram of a structure of a device for sending a reference signal according to an embodiment herein.

FIG. 2 is a diagram of a structure of a device for sending a reference signal according to an embodiment herein. As shown in FIG. 2, the device contains a determining module 22 arranged for determining, according to a preset mode, a location of a time-frequency resource for sending a reference signal in a Transmission Time Interval (TTI); and a sending module 24 coupled to the determining module 22 and arranged for sending the reference signal according to the location of the time-frequency resource.

It is exemplified below how the location of the DMRS is determined according to the preset mode with reference to implementation herein.

In step S102, the location of the time-frequency resource for sending the reference signal in the TTI may be determined according to the preset mode as follows. A subcarrier corresponding to the time-frequency resource may be preset. That is, the reference signal may correspond to a preset subcarrier. The reference signal may correspond to one or more symbols meeting a first preset condition in the TTI on the subcarrier.

The first preset condition may include at least one mode as follows.

In a mode 1, the one or more symbols may be determined according to at least one of a port of an antenna sending a Cell-specific Reference Signal (CRS) or an identification of a cell.

In a mode 2, an index n of the one or more symbols may be no less than m. The m may be an integer no less than zero. The m may be a number of symbols occupied by a Physical Downlink Control Channel (PDCCH). Alternatively, the m may be a preset number of symbols. The index of the one or more symbols may be an index of a symbol in a time slot. The n∈{0, 1, 2, 3, 4, 5, 6} for a normal Cyclic Prefix (CP). The n∈{0, 1, 2, 3, 4, 5} for an extended CP.

Based on the location in the time-frequency domain in the preset mode, and the modes 1 and 2, there may be multiple subcarrier indices k corresponding to the location of the time-frequency resource. The present disclosure may be exemplified below with reference to a localized implementation herein.

The reference signal may correspond to the subcarrier with an index k∈{0, 1, 5, 6, 10, 11}.

The one or more symbols on the subcarrier may be determined according to at least one of the port of the antenna sending the CRS or the identification of the cell in at least one mode as follows.

$n_{ID}^{cell}$ mod 3=0.

The p may be the port of the antenna sending the CRS. For p=0, or for (p=0 and p=1), the reference signal may correspond to the index n∈{0, 1, 2, 3, 4, 5, 6} on the subcarrier with the index k∈{1, 5, 10, 11} corresponding to the reference signal. The reference signal may correspond to the index n∈{1, 2, 3, 5, 6} on the subcarrier with the index k∈{0, 6} corresponding to the reference signal.

For p=0, p=1, p=2, and p=3, the reference signal may correspond to the index n∈{0, 1, 2, 3, 4, 5, 6} on the subcarrier with the index k∈{1, 5, 10, 11} corresponding to the reference signal. The reference signal may correspond to the index n∈{2, 3, 5, 6} on the subcarrier with the index k∈{0, 6} corresponding to the reference signal.

For p=0, or for (p=0 and p=1), the CRS may be sent at the port 0 of the antenna, or at the ports 0 and 1 of the antenna. For p=0, p=1, p=2, and p=3, the CRS may be sent at the ports 0, 1, 2, and 3 of the antenna. Likewise, a port number of the antenna for sending the CRS mentioned below may have a similar explanation.

$n_{ID}^{cell}$ mod 3=1.

The p may be the port of the antenna sending the CRS. For p=0, the reference signal may correspond to the index n∈{0, 1, 2, 3, 4, 5, 6} on the subcarrier with the index k∈{0, 5, 6, 10, 11} corresponding to the reference signal. The reference signal may correspond to the index n∈{1, 2, 3, 5, 6} on the subcarrier with the index k∈{1} corresponding to the reference signal.

For p=0 and p=1, the reference signal may correspond to the index n∈{0, 1, 2, 3, 4, 5, 6} on the subcarrier with the index k∈{0, 5, 6, 11} corresponding to the reference signal. The reference signal may correspond to the index n∈{1, 2, 3, 5, 6} on the subcarrier with the index k∈{1, 10} corresponding to the reference signal.

For p=0, p=1, p=2, and p=3, the reference signal may correspond to the index n∈{0, 1, 2, 3, 4, 5, 6} on the subcarrier with the index k∈{0, 5, 6, 11} corresponding to the reference signal. The reference signal may correspond to the index n∈{2, 3, 5, 6} on the subcarrier with the index k∈{1, 10} corresponding to the reference signal.

$n_{ID}^{cell}$ mod 3=2.

The p may be the port of the antenna sending the CRS. For p=0, the reference signal may correspond to the index n∈{0, 1, 2, 3, 4, 5, 6} on the subcarrier with the index k∈{0, 1, 5, 6, 10, 11} corresponding to the reference signal.

For p=0 and p=1, the reference signal may correspond to the index n∈{0, 1, 2, 3, 4, 5, 6} on the subcarrier with the index k∈{0, 1, 6, 10} corresponding to the reference signal. The reference signal may correspond to the index n∈{1, 2, 3, 5, 6} on the subcarrier with the index k∈{5, 11} corresponding to the reference signal.

For p=0, p=1, p=2, and p=3, the reference signal may correspond to the index n∈{0, 1, 2, 3, 4, 5, 6} on the subcarrier with the index k∈{0, 1, 6, 10} corresponding to the reference signal. The reference signal may correspond to the index n∈{2, 3, 5, 6} on the subcarrier with the index k∈{5, 11} corresponding to the reference signal.

The reference signal may correspond to the subcarrier with an index k∈{1, 4, 7, 10}.

The one or more symbols on the subcarrier may be determined according to at least one of the port of the antenna sending the CRS or the identification of the cell in at least one mode as follows.

$n_{ID}^{cell}$ mod 3=0 or $n_{ID}^{cell}$ mod 3=2.

The subcarrier with the index k∈{1, 4, 7, 10} may correspond to the index n∈{0, 1, 2, 3, 4, 5}.

$n_{ID}^{cell}$ mod 3=1.

The p may be the port of the antenna sending the CRS. For p=0, the reference signal may correspond to the index n∈{1, 2, 4, 5} on the subcarrier with the index k∈{1, 7} corresponding to the reference signal. The reference signal may correspond to the index n∈{0, 1, 2, 3, 4, 5} on the subcarrier with the index k∈{4, 10} corresponding to the reference signal.

For p=0 and p=1, the reference signal may correspond to the index n∈{1, 2, 4, 5} on the subcarrier with the index k∈{1, 4, 7, 10} corresponding to the reference signal.

For p=0, p=1, p=2, and p=3, the reference signal may correspond to the index n∈{2, 4, 5} on the subcarrier with the index k∈{1, 4, 7, 10} corresponding to the reference signal.

The reference signal may correspond to the subcarrier with an index k∈{2, 5, 8, 11}.

The one or more symbols on the subcarrier may be determined according to at least one of the port of the antenna sending the CRS or the identification of the cell in at least one mode as follows.

For $n_{ID}^{cell}$ mod 3=0 or $n_{ID}^{cell}$ mod 3=1, the reference signal may correspond to the index n∈{0, 1, 2, 3, 4, 5} on the subcarrier with the index k∈{2, 5, 8, 11} corresponding to the reference signal.

$n_{ID}^{cell}$ mod 3=2.

The p may be the port of the antenna sending the CRS. For p=0, the reference signal may correspond to the index n∈{1, 2, 4, 5} on the subcarrier with the index k∈{2, 8} corresponding to the reference signal. The reference signal may correspond to the index n∈{0, 1, 2, 3, 4, 5} on the subcarrier with the index k∈{4, 10} corresponding to the reference signal.

For p=0 and p=1, the reference signal may correspond to the index n∈{1, 2, 4, 5} on the subcarrier with the index k∈{2, 5, 8, 11} corresponding to the reference signal.

For p=0, p=1, p=2, and p=3, the reference signal may correspond to the index n∈{2, 4, 5} on the subcarrier with the index k∈{2, 5, 8, 11} corresponding to the reference signal.

The three implementations aforementioned are in accordance to embodiments herein and may not limit the present disclosure.

The reference signal may correspond to one or more symbols with minimal indices meeting the first preset condition in the TTI.

In step S102, the location of the time-frequency resource for sending the reference signal in the TTI may be determined according to the preset mode as follows. The reference signal may correspond to one or more symbols meeting a second preset condition in the TTI. The reference signal may correspond to a subcarrier on the one or more symbols. The subcarrier may be determined according to at least one of a port of an antenna sending a CRS or an identification of a cell.

The second preset condition may include at least one of the following. The one or more symbols may be determined according to at least one of the port of the antenna sending the CRS or the identification of the cell. An index n of the one or more symbols may be no less than m. The m may be an integer no less than zero. The m may be a number of symbols occupied by a PDCCH. Alternatively, the m may be a preset number of symbols. If the reference signal corresponds to the subcarrier with an index $k\in\{2, 5, 8, 11\}$, then the $n\in\{0, 1, 2, 3, 4, 5, 6\}$ for a normal CP. The $n\in\{0, 1, 2, 3, 4, 5, 6\}$ for an extended CP.

Based on the second preset condition, the location of the one or more symbols in the frequency domain may be determined according to at least one of the port of the antenna sending the CRS or the identification of the cell in at least one mode as follows.

$n_{ID}^{cell}$ mod 3=0.

The p may be the port of the antenna sending the CRS. For p=0, the reference signal may correspond to the subcarrier with an index $k\in\{1, 2, 3, 4, 5, 7, 8, 9, 10, 11\}$.

For (p=0 and p=1), or (p=0, p=1, p=2, and p=3), the reference signal may correspond to the subcarrier with the index $k\in\{1, 2, 4, 5, 7, 8, 10, 11\}$.

$n_{ID}^{cell}$ mod 3=1.

The p may be the port of the antenna sending the CRS. For p=0, the reference signal may correspond to the subcarrier with the index $k\in\{0, 2, 3, 4, 5, 6, 8, 9, 10, 11\}$.

For (p=0 and p=1), or (p=0, p=1, p=2, and p=3), the reference signal may correspond to the subcarrier with the index $k\in\{0, 2, 3, 5, 6, 8, 9, 11\}$.

$n_{ID}^{cell}$ mod 3=2.

The p may be the port of the antenna sending the CRS. For p=0, the reference signal may correspond to the subcarrier with the index $k\in\{0, 1, 3, 4, 5, 6, 7, 9, 10, 11\}$.

For (p=0 and p=1), or (p=0, p=1, p=2, and p=3), the reference signal may correspond to the subcarrier with the index $k\in\{0, 1, 3, 4, 6, 7, 9, 10\}$.

The three implementations aforementioned are in accordance to embodiments herein and may not limit the present disclosure.

The reference signal may correspond to one or more symbols with minimal indices meeting the second preset condition in the TTI.

In steps S102 and S104, A TTI may be adjacent to one or more symbols in a neighbor TTI. The one or more symbols in the neighbor TTI may contain the reference signal. The time-frequency resource may correspond to a symbol with an index $n\in\{2, 3, 5, 6\}$ for a normal CP. The time-frequency resource may correspond to the symbol with the index $n\in\{2, 4, 5\}$ for an extended CP. The reference signal may correspond to one or more symbols with minimal indices.

In steps S102 and S104, frequency resource allocation in the TTI may be done at a granularity of 12×y subcarriers. The y may be an integer greater than 1. The reference signal may occupy 1, 2, 3, or 4 of 12 Resource Elements (RE) contained in a PRB on a symbol containing the reference signal. The reference signal may occupy REs that are consecutive in the frequency domain.

An aforementioned embodiment herein may apply to a Base Station (BS). An embodiment herein illustrated below may apply to User Equipment (UE) receiving the reference signal.

A device for receiving a reference signal according to an embodiment herein is provided. The device applies to User Equipment (UE). The device contains a receiving module arranged for receiving a reference signal sent by a Base Station (BS). A location of a time-frequency resource for sending the reference signal in a Transmission Time Interval (TTI) is determined according to a preset mode.

The receiving module may be arranged for receiving the reference signal sent by the BS according to the location of the time-frequency resource. The BS may determine the location of the time-frequency resource for sending the reference signal in the TTI according to the preset mode.

The reference signal may correspond to a preset subcarrier. The reference signal may correspond to one or more symbols meeting a first preset condition in the TTI on the subcarrier.

The first preset condition may include at least one mode as follows.

In a mode 1, the one or more symbols may be determined according to at least one of a port of an antenna sending a Cell-specific Reference Signal (CRS) or an identification of a cell.

In a mode 2, an index n of the one or more symbols may be no less than m. The m may be an integer no less than zero. The m may be a number of symbols occupied by a Physical Downlink Control Channel (PDCCH). Alternatively, the m may be a preset number of symbols. The index of the one or more symbols may be an index of a symbol in a time slot. The $n\in\{0, 1, 2, 3, 4, 5, 6\}$ for a normal Cyclic Prefix (CP). The $n\in\{0, 1, 2, 3, 4, 5\}$ for an extended CP.

Based on the location in the time-frequency domain in the preset mode, and the modes 1 and 2, there may be multiple subcarrier indices k corresponding to the location of the time-frequency resource. The present disclosure may be exemplified below with reference to a localized implementation herein.

The reference signal may correspond to the subcarrier with an index $k\in\{0, 1, 5, 6, 10, 11\}$.

The one or more symbols on the subcarrier may be determined according to at least one of the port of the antenna sending the CRS or the identification of the cell in at least one mode as follows.

$n_{ID}^{cell}$ mod 3=0.

The p may be the port of the antenna sending the CRS. For p=0, or for (p=0 and p=1), the reference signal may correspond to the index $n\in\{0, 1, 2, 3, 4, 5, 6\}$ on the subcarrier with the index $k\in\{1, 5, 10, 11\}$ corresponding to the reference signal. The reference signal may correspond to the index $n\in\{1, 2, 3, 5, 6\}$ on the subcarrier with the index $k\in\{0, 6\}$ corresponding to the reference signal.

For p=0, p=1, p=2, and p=3, the reference signal may correspond to the index $n\in\{0, 1, 2, 3, 4, 5, 6\}$ on the subcarrier with the index $k\in\{1, 5, 10, 11\}$ corresponding to the reference signal. The reference signal may correspond to the index $n\in\{2, 3, 5, 6\}$ on the subcarrier with the index $k\in\{0, 6\}$ corresponding to the reference signal.

For p=0, or for (p=0 and p=1), the CRS may be sent at the port 0 of the antenna, or at the ports 0 and 1 of the antenna. For p=0, p=1, p=2, and p=3, the CRS may be sent at the ports 0, 1, 2, and 3 of the antenna. Likewise, a port number of the antenna for sending the CRS mentioned below may have a similar explanation.

$n_{ID}^{cell} \mod 3=1$.

The p may be the port of the antenna sending the CRS. For p=0, the reference signal may correspond to the index n∈{0, 1, 2, 3, 4, 5, 6} on the subcarrier with the index k∈{0, 5, 6, 10, 11} corresponding to the reference signal. The reference signal may correspond to the index n∈{1, 2, 3, 5, 6} on the subcarrier with the index k∈{1} corresponding to the reference signal.

For p=0 and p=1, the reference signal may correspond to the index n∈{0, 1, 2, 3, 4, 5, 6} on the subcarrier with the index k∈{0, 5, 6, 11} corresponding to the reference signal. The reference signal may correspond to the index n∈{1, 2, 3, 5, 6} on the subcarrier with the index k∈{1, 10} corresponding to the reference signal.

For p=0, p=1, p=2, and p=3, the reference signal may correspond to the index n∈{0, 1, 2, 3, 4, 5, 6} on the subcarrier with the index k∈{0, 5, 6, 11} corresponding to the reference signal. The reference signal may correspond to the index n∈{2, 3, 5, 6} on the subcarrier with the index k∈{1, 10} corresponding to the reference signal.

$n_{ID}^{cell} \mod 3=2$.

The p may be the port of the antenna sending the CRS. For p=0, the reference signal may correspond to the index n∈{0, 1, 2, 3, 4, 5, 6} on the subcarrier with the index k∈{0, 1, 5, 6, 10, 11} corresponding to the reference signal.

For p=0 and p=1, the reference signal may correspond to the index n∈{0, 1, 2, 3, 4, 5, 6} on the subcarrier with the index k∈{0, 1, 6, 10} corresponding to the reference signal. The reference signal may correspond to the index n∈{1, 2, 3, 5, 6} on the subcarrier with the index k∈{5, 11} corresponding to the reference signal.

For p=0, p=1, p=2, and p=3, the reference signal may correspond to the index n∈{0, 1, 2, 3, 4, 5, 6} on the subcarrier with the index k∈{0, 1, 6, 10} corresponding to the reference signal. The reference signal may correspond to the index n∈{2, 3, 5, 6} on the subcarrier with the index k∈{5, 11} corresponding to the reference signal.

The reference signal may correspond to the subcarrier with an index k∈{1, 4, 7, 10}.

The one or more symbols on the subcarrier may be determined according to at least one of the port of the antenna sending the CRS or the identification of the cell in at least one mode as follows.

$n_{ID}^{cell} \mod 3=0$ or $n_{ID}^{cell} \mod 3=2$.

The subcarrier with the index k∈{1, 4, 7, 10} may correspond to the index n E {0, 1, 2, 3, 4, 5}.

$n_{ID}^{cell} \mod 3=1$.

The p may be the port of the antenna sending the CRS. For p=0, the reference signal may correspond to the index n∈{1, 2, 4, 5} on the subcarrier with the index k∈{1, 7} corresponding to the reference signal. The reference signal may correspond to the index n∈{0, 1, 2, 3, 4, 5} on the subcarrier with the index k∈{4, 10} corresponding to the reference signal.

For p=0 and p=1, the reference signal may correspond to the index n∈{1, 2, 4, 5} on the subcarrier with the index k∈{1, 4, 7, 10} corresponding to the reference signal.

For p=0, p=1, p=2, and p=3, the reference signal may correspond to the index n∈{2, 4, 5} on the subcarrier with the index k∈{1, 4, 7, 10} corresponding to the reference signal.

The reference signal may correspond to the subcarrier with an index k∈{2, 5, 8, 11}.

The one or more symbols on the subcarrier may be determined according to at least one of the port of the antenna sending the CRS or the identification of the cell in at least one mode as follows.

For $n_{ID}^{cell} \mod 3=0$ or $n_{ID}^{cell} \mod 3=1$, the reference signal may correspond to the index n∈{0, 1, 2, 3, 4, 5} on the subcarrier with the index k∈{2, 5, 8, 11} corresponding to the reference signal.

$n_{ID}^{cell} \mod 3=2$.

The p may be the port of the antenna sending the CRS. For p=0, the reference signal may correspond to the index n∈{1, 2, 4, 5} on the subcarrier with the index k∈{2, 8} corresponding to the reference signal. The reference signal may correspond to the index n∈{0, 1, 2, 3, 4, 5} on the subcarrier with the index k∈{4, 10} corresponding to the reference signal.

For p=0 and p=1, the reference signal may correspond to the index n∈{1, 2, 4, 5} on the subcarrier with the index k∈{2, 5, 8, 11} corresponding to the reference signal.

For p=0, p=1, p=2, and p=3, the reference signal may correspond to the index n∈{2, 4, 5} on the subcarrier with the index k∈{2, 5, 8, 11} corresponding to the reference signal.

The three implementations aforementioned are in accordance to embodiments herein and may not limit the present disclosure.

The reference signal may correspond to one or more symbols with minimal indices meeting the first preset condition in the TTI.

In step S102, the location of the time-frequency resource for sending the reference signal in the TTI may be determined according to the preset mode as follows. The reference signal may correspond to one or more symbols meeting a second preset condition in the TTI. The reference signal may correspond to a subcarrier on the one or more symbols. The subcarrier may be determined according to at least one of a port of an antenna sending a CRS or an identification of a cell.

The second preset condition may include at least one of the following. The one or more symbols may be determined according to at least one of the port of the antenna sending the CRS or the identification of the cell. An index n of the one or more symbols may be no less than m. The m may be an integer no less than zero. The m may be a number of symbols occupied by a PDCCH. Alternatively, the m may be a preset number of symbols. If the reference signal corresponds to the subcarrier with an index k∈{2, 5, 8, 11}, then the n∈{0, 1, 2, 3, 4, 5, 6} for a normal CP. The n∈{0, 1, 2, 3, 4, 5, 6} for an extended CP.

Based on the second preset condition, the location of the one or more symbols in the frequency domain may be determined according to at least one of the port of the antenna sending the CRS or the identification of the cell in at least one mode as follows.

$n_{ID}^{cell} \mod 3=0$.

The p may be the port of the antenna sending the CRS. For p=0, the reference signal may correspond to the subcarrier with an index k∈{1, 2, 3, 4, 5, 7, 8, 9, 10, 11}.

For (p=0 and p=1), or (p=0, p=1, p=2, and p=3), the reference signal may correspond to the subcarrier with the index k∈{1, 2, 4, 5, 7, 8, 10, 11}.

$n_{ID}^{cell} \mod 3=1$.

The p may be the port of the antenna sending the CRS. For p=0, the reference signal may correspond to the subcarrier with the index k∈{0, 2, 3, 4, 5, 6, 8, 9, 10, 11}.

For (p=0 and p=1), or (p=0, p=1, p=2, and p=3), reference signal may correspond to the subcarrier with the index k∈{0, 2, 3, 5, 6, 8, 9, 11}.

$n_{ID}^{cell} \mod 3=2$.

The p may be the port of the antenna sending the CRS. For p=0, the reference signal may correspond to the subcarrier with the index k∈{0, 1, 3, 4, 5, 6, 7, 9, 10, 11}.

For (p=0 and p=1), or (p=0, p=1, p=2, and p=3), the reference signal may correspond to the subcarrier with the index k∈{0, 1, 3, 4, 6, 7, 9, 10}.

The three implementations aforementioned are in accordance to embodiments herein and may not limit the present disclosure.

The reference signal may correspond to one or more symbols with minimal indices meeting the second preset condition in the TTI.

In steps S102 and S104, A TTI may be adjacent to one or more symbols in a neighbor TTI. The one or more symbols in the neighbor TTI may contain the reference signal. The time-frequency resource may correspond to a symbol with an index n∈{2, 3, 5, 6} for a normal CP. The time-frequency resource may correspond to the symbol with the index n∈{2, 4, 5} for an extended CP. The reference signal may correspond to one or more symbols with minimal indices.

In steps S102 and S104, frequency resource allocation in the TTI may be done at a granularity of 12×y subcarriers. The y may be an integer greater than 1. The reference signal may occupy 1, 2, 3, or 4 of 12 Resource Elements (RE) contained in a PRB on a symbol containing the reference signal. The reference signal may occupy REs that are consecutive in the frequency domain.

The present discloser is exemplified below according to an embodiment herein.

Embodiment 1

A design for a DMRS for a TTI of 0.5 ms according to an embodiment herein is provided. The design may apply beyond a DMRS as needed.

An existing mode of the DMRS may lag behind in a short TTI, which is against lowering a processing delay of/for UE. According to an embodiment herein, the location of the DMRS may be moved forward. As the DMRS is UE specific, changing the location of the DMRS will not impact legacy UE. By advancing the location of the DMRS, UE is allowed to assess and decode a channel in time.

The location of the DMRS may be advanced given that the advanced location of the DMRS is not in conflict with the location of a CRS.

The present discloser is exemplified below respectively with an odd time slot and an even time slot.

An odd time slot may refer to a second time slot in an existing Long Term Evolution (LTE) subframe.

The location of the DMRS may not be in conflict with the location of a CRS. The location of the DMRS may be determined in at least one mode as follows. In a mode that follows, for a normal CP, there may be 7 OFDM symbols in a time slot, with integer indices 0 to 6 in chronological order, respectively. For an extended CP, there may be 6 OFDM symbols in a time slot, with integer indices 0 to 5 in chronological order, respectively. Subcarriers in a PRB may be given indices 0 to 11 in ascending frequencies.

Figure 3:
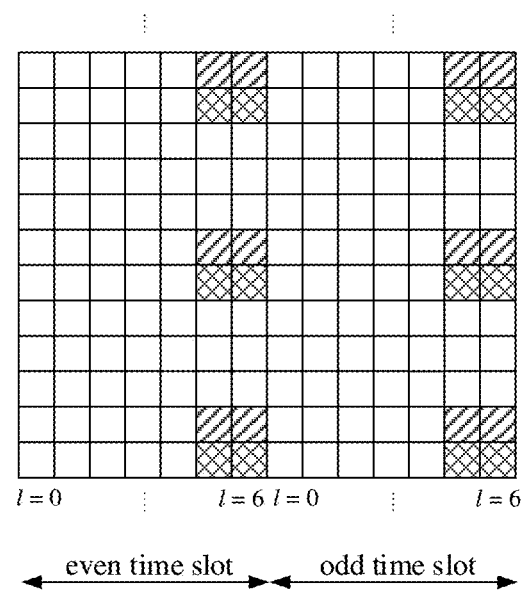
FIG. 3 is a diagram of a location of a time-frequency resource for sending an existing DMRS under a normal Cyclic Prefix (CP) according to an embodiment herein.
Figure 4:
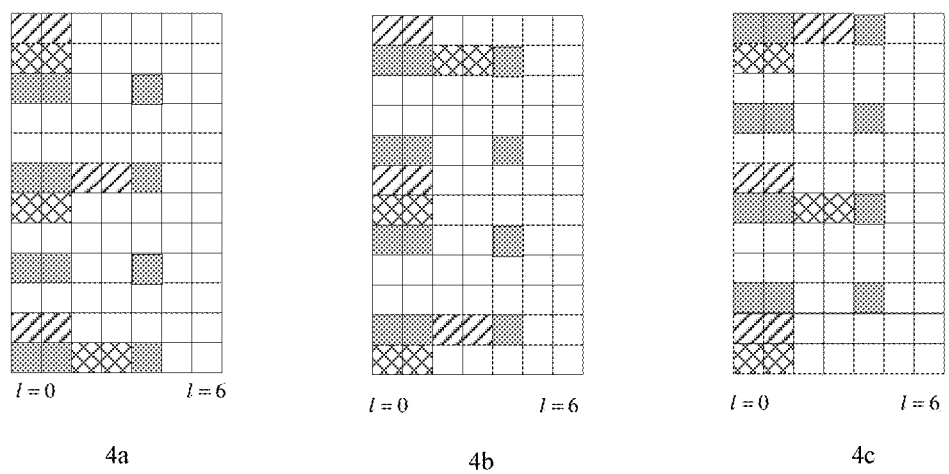
FIG. 4 is a diagram of the location after a translation of the existing DMRS in a time domain according to an embodiment herein.

In a mode 1, the location of the DMRS in the frequency domain may remain the same as that in related art. The DMRS may be translated in the time domain onto a symbol with a minimal index beyond an RE bearing the CRS. FIG. 3 is a diagram of a location of a time-frequency resource for sending an existing DMRS under a normal Cyclic Prefix (CP) according to an embodiment herein. As shown in FIG. 3, an RE with diagonals may be a time-frequency resource corresponding to ports 7, 8, 11, and 13 of an antenna. An RE with a grid may be a time-frequency resource corresponding to ports 9, 10, 12, and 14 of the antenna. FIG. 4 is a diagram of the location after a translation of the existing DMRS in a time domain according to an embodiment herein. As shown in FIG. 4, a darkened RE may be a time-frequency resource corresponding to a CRS. The CRS may be sent at a port 4 of the antenna. As the location of the time-frequency resource of the CRS is determined according to an identification (ID) of a cell, the location of the frequency resource of the DMRS may be determined according to the ID of the cell as well.

As shown in FIGS. 4, 4a, 4b, and 4c show the location of the DMRS for $n_{ID}^{cell}$ mod 3=0, $n_{ID}^{cell}$ mod 3=1, and $n_{ID}^{cell}$ mod 3=2, respectively. The "mod" may refer to a modulus operator.

The location of the time-frequency resource of the DMRS may be determined according to a maximal port number of the antenna. As shown in FIG. 2, no matter what the real port number of the antenna for the CRS is, the location of the time resource of the DMRS may be determined according to the port 4 of the antenna for the CRS.

Figure 5:
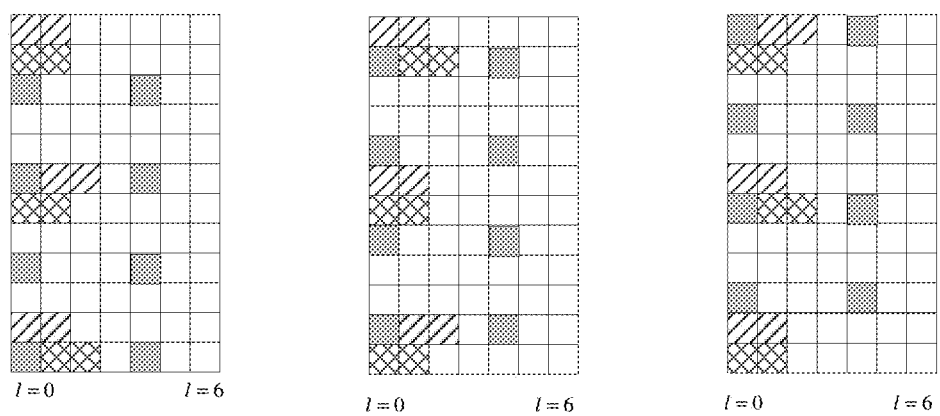
FIG. 5 is a diagram of a location of a time-frequency resource for sending a DMRS according to an embodiment herein.

Alternatively, the location of the time-frequency resource of the DMRS may be determined according to the real port number of the antenna for the CRS. For example, FIG. 5 is a diagram of a location of a time-frequency resource for sending a DMRS according to an embodiment herein, when the real port number of the antenna for the CRS is 2. As shown in FIG. 5, the CP may be normal.

The DMRS may occupy a preset number of symbols, which is not limited to 2 as in existing LTE. Different subcarriers may correspond to different numbers of symbols. For example, one subcarrier may correspond to 1 symbol, and another subcarrier may correspond to 2 symbols. However, on each subcarrier, the DMRS may always occupy one or more symbols with minimal indices beyond symbols occupied by the CRS.

The above may be expressed below using mathematical formulas. The DMRS may correspond to the subcarrier with an index k∈{0, 1, 5, 6, 10, 11} for the normal CP.

The one or more symbols may be determined according to at least one of the port of the antenna sending the CRS or the identification of the cell in at least one mode as follows.

$n_{ID}^{cell}$ mod 3=0.

The p may be the port of the antenna sending the CRS. For p=0, or for (p=0 and p=1), the DMRS may correspond to the subcarrier with the index k∈{1, 5, 10, 11}, which may bear no CRS. The DMRS may correspond to the index n∈{0, 1, 2, 3, 4, 5, 6} on the subcarrier. The two symbols with minimal indices 0 and 1 may be taken for the DMRS. The DMRS may correspond to the subcarrier with the index k∈{0, 6}. The first symbol on the subcarrier may bear the CRS, and may not transmit DMRS. Then, the DMRS may correspond to the index n∈{1, 2, 3, 5, 6} on the subcarrier. The two symbols with minimal indices 1 and 2 may be taken for the DMRS.

For p=0, p=1, p=2, and p=3, the DMRS may correspond to the subcarrier with the index k∈{1, 5, 10, 11}. The e subcarrier may bear no CRS. The DMRS may correspond to the index n∈{0, 1, 2, 3, 4, 5, 6} on the subcarrier. The two symbols with minimal indices 0 and 1 may be taken for the DMRS. The DMRS may correspond to the subcarrier with the index k∈{0, 6}. The first two symbols on the subcarrier may bear the CRS, and may not transmit DMRS. Then, the DMRS may correspond to the index n∈{2, 3, 5, 6} on the subcarrier. The two symbols with minimal indices 2 and 3 may be taken for the DMRS.

$n_{ID}^{cell}$ mod 3=1.

The p may be the port of the antenna sending the CRS. Similarly, for p=0, the DMRS may correspond to the index n∈{0, 1, 2, 3, 4, 5, 6} on the subcarrier with the index k∈{0, 5, 6, 10, 11} corresponding to the DMRS. The DMRS may correspond to the index n∈{1, 2, 3, 5, 6} on the subcarrier with the index k E corresponding to the DMRS.

For p=0 and p=1, the DMRS may correspond to the index n∈{0, 1, 2, 3, 4, 5, 6} on the subcarrier with the index k∈{0, 5, 6, 11} corresponding to the DMRS. The DMRS may correspond to the index n∈{1, 2, 3, 5, 6} on the subcarrier with the index k∈{1, 10} corresponding to the DMRS.

For p=0, p=1, p=2, and p=3, the DMRS may correspond to the index n∈{0, 1, 2, 3, 4, 5, 6} on the subcarrier with the index k∈{0, 5, 6, 11} corresponding to the DMRS. The DMRS may correspond to the index n∈{2, 3, 5, 6} on the subcarrier with the index k∈{1, 10} corresponding to the DMRS.

$n_{ID}^{cell}$ mod 3=2.

The p may be the port of the antenna sending the CRS. For p=0, the DMRS may correspond to the index n∈{0, 1, 2, 3, 4, 5, 6} on the subcarrier with the index k∈{0, 1, 5, 6, 10, 11} corresponding to the DMRS.

For p=0 and p=1, the DMRS may correspond to the index n∈{0, 1, 2, 3, 4, 5, 6} on the subcarrier with the index k∈{0, 1, 6, 10} corresponding to the DMRS. The DMRS may correspond to the index n∈{1, 2, 3, 5, 6} on the subcarrier with the index k∈{5, 11} corresponding to the DMRS.

For p=0, p=1, p=2, and p=3, the DMRS may correspond to the index n∈{0, 1, 2, 3, 4, 5, 6} on the subcarrier with the index k∈{0, 1, 6, 10} corresponding to the DMRS. The DMRS may correspond to the index n∈{2, 3, 5, 6} on the subcarrier with the index k∈{5, 11} corresponding to the DMRS.

For the extended CP, the DMRS may correspond to the subcarrier with an index k∈{1, 4, 7, 10}.

The one or more symbols on the subcarrier may be determined according to at least one of the port of the antenna sending the CRS or the identification of the cell in at least one mode as follows.

$n_{ID}^{cell}$ mod 3=0 or $n_{ID}^{cell}$ mod 3=2.

The subcarrier with the index k∈{1, 4, 7, 10} may correspond to the index n∈{0, 1, 2, 3, 4, 5}.

$n_{ID}^{cell}$ mod 3=1.

The p may be the port of the antenna sending the CRS. For p=0, the DMRS may correspond to the index n∈{1, 2, 4, 5} on the subcarrier with the index k∈{1, 7} corresponding to the DMRS. The DMRS may correspond to the index n∈{0, 1, 2, 3, 4, 5} on the subcarrier with the index k∈{4, 10} corresponding to the DMRS.

For p=0 and p=1, the DMRS may correspond to the index n∈{1, 2, 4, 5} on the subcarrier with the index k∈{1, 4, 7, 10} corresponding to the DMRS.

For p=0, p=1, p=2, and p=3, the DMRS may correspond to the index n∈{2, 4, 5} on the subcarrier with the index k∈{1, 4, 7, 10} corresponding to the DMRS.

Alternatively, for the extended CP, the DMRS may correspond to the subcarrier with an index k∈{2, 5, 8, 11}.

The one or more symbols on the subcarrier may be determined according to at least one of the port of the antenna sending the CRS or the identification of the cell in at least one mode as follows.

For $n_{ID}^{cell}$ mod 3=0 or $n_{ID}^{cell}$ mod 3=1, the DMRS may correspond to the index n∈{0, 1, 2, 3, 4, 5} on the subcarrier with the index k∈{2, 5, 8, 11} corresponding to the DMRS.

$n_{ID}^{cell}$ mod 3=2.

The p may be the port of the antenna sending the CRS. For p=0, the DMRS may correspond to the index n∈{1, 2, 4, 5} on the subcarrier with the index k∈{2, 8} corresponding to the DMRS. The DMRS may correspond to the index n∈{0, 1, 2, 3, 4, 5} on the subcarrier with the index k∈{4, 10} corresponding to the DMRS.

For p=0 and p=1, the DMRS may correspond to the index n∈{1, 2, 4, 5} on the subcarrier with the index k∈{2, 5, 8, 11} corresponding to the DMRS.

For p=0, p=1, p=2, and p=3, the DMRS may correspond to the index n∈{2, 4, 5} on the subcarrier with the index k∈{1, 4, 7, 10} corresponding to the DMRS.

The location of the DMRS in the frequency domain may be preset, without being limited to the location of the DMRS in the frequency domain in existing LTE. For example, the DMRS may be located at subcarrier index 2 in the frequency domain. For $n_{ID}^{cell}$ mod 3=0, subcarrier index 2 may bear no CRS. Then, the DMRS may occupy the time resource of symbols 0 and 1.

In a mode 2, the location of the DMRS in the frequency domain may remain the same as that in related art. The DMRS may be moved in the time domain onto a symbol bearing no CRS.

The location of the time-frequency resource of the DMRS may be determined according to a maximal port number of the antenna. Alternatively, the location of the time-frequency resource of the DMRS may be determined according to the real port number of the antenna for the CRS.

Figure 6:
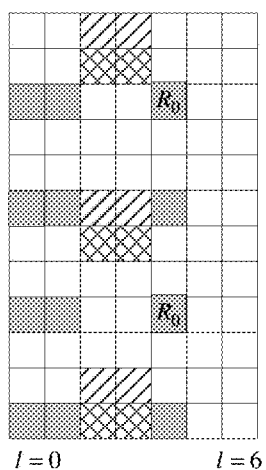
FIG. 6 is a diagram of a DMRS being moved in the time domain onto a symbol bearing no Cell-specific Reference Signal (CRS), with a location of the DMRS in a frequency domain remaining the same as that in related art according to an embodiment herein.

For example, for the normal CP, when the port number of the antenna for the CRS is 4, symbols with indices 2, 3, 5, and 6 may be available. To reduce a decoding delay, the symbols with indices 2 and 3 may be selected. For the extended CP, when the port number of the antenna for the CRS is 4, symbols with indices 2, 4, and 5 may be available. The symbols with indices 2 and 4 may be selected. FIG. 6 is a diagram of a DMRS being moved in the time domain onto a symbol bearing no Cell-specific Reference Signal (CRS), with a location of the DMRS in a frequency domain remaining the same as that in related art according to an embodiment herein.

The DMRS may occupy a preset location in the frequency domain, which is not limited to the location of the DMRS in the frequency domain as in existing LTE.

The DMRS may occupy a preset number of symbols, which is not limited to 2 as in existing LTE. Different subcarriers may correspond to different numbers of symbols. For example, one subcarrier may correspond to 1 symbol, and another subcarrier may correspond to 2 symbols. However, a DMRS-bearing symbol may bear no CRS.

Figure 7:
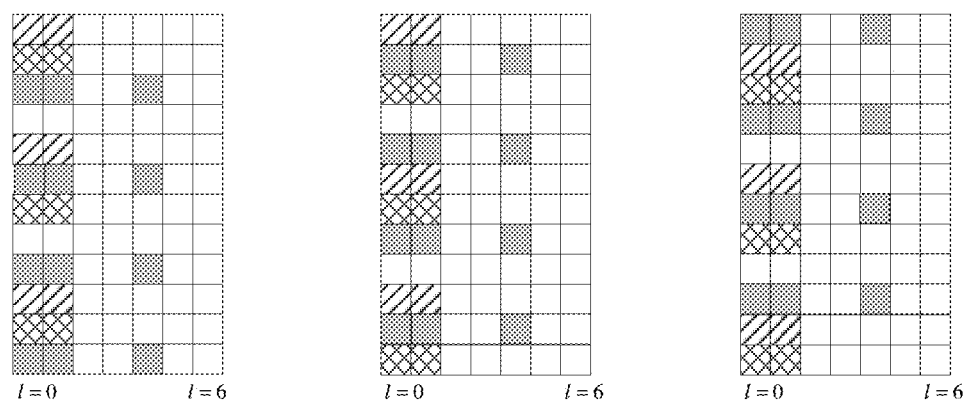
FIG. 7 is a diagram of moving a DMRS in related art onto two foremost symbols, and placing the DMRS at a location beyond that of a CRS in the frequency domain according to an embodiment herein.

FIG. 7 is a diagram of moving a DMRS in related art onto two foremost symbols, and placing the DMRS at a location beyond that of a CRS in the frequency domain according to an embodiment herein. In a mode 3, when the port number of the antenna for the CRS is 4, the two foremost symbols may be occupied by the CRS. Accordingly, an RE occupied by (or bearing) the CRS may not be available/selected. As the location of the time-frequency resource of the CRS is determined according to an identification (ID) of a cell, the location of the frequency resource of the DMRS may be determined according to the ID of the cell as well. FIG. 7 provides cases of $n_{ID}^{cell}$ mod 3=0, 1, and 2 for the normal CP.

The above may be expressed below using mathematical formulas, which may apply to both the normal CP and the extended CP. The one or more symbols may be determined according to at least one of the port of the antenna sending the CRS or the identification of the cell in at least one mode as follows.

$n_{ID}^{cell} \mod 3=0$.

The p may be the port of the antenna sending the CRS. For p=0, the DMRS may correspond to the subcarrier with an index k∈{1, 2, 3, 4, 5, 7, 8, 9, 10, 11}.

For (p=0 and p=1), or (p=0, p=1, p=2, and p=3), the DMRS may correspond to the subcarrier with the index k∈{1, 2, 4, 5, 7, 8, 10, 11}.

$n_{ID}^{cell} \mod 3=1$.

The p may be the port of the antenna sending the CRS. For p=0, the DMRS may correspond to the subcarrier with the index k∈{0, 2, 3, 4, 5, 6, 8, 9, 10, 11}.

For (p=0 and p=1), or (p=0, p=1, p=2, and p=3), the DMRS may correspond to the subcarrier with the index k∈{0, 2, 3, 5, 6, 8, 9, 11}.

$n_{ID}^{cell} \mod 3=2$.

The p may be the port of the antenna sending the CRS. For p=0, the DMRS may correspond to the subcarrier with the index k∈{0, 1, 3, 4, 5, 6, 7, 9, 10, 11}.

For (p=0 and p=1), or (p=0, p=1, p=2, and p=3), the DMRS may correspond to the subcarrier with the index k∈{0, 1, 3, 4, 6, 7, 9, 10}.

The DMRS may occupy a preset number of symbols, which is not limited to 2 as in existing LTE. Different subcarriers may correspond to different numbers of symbols. For example, one subcarrier may correspond to 1 symbol, and another subcarrier may correspond to 2 symbols. However, on each subcarrier, the DMRS may always occupy one or more symbols with minimal indices in the TTI.

An even time slot may refer to a first time slot in an existing LTE subframe.

For the even time slot, a starting location of the DMRS may further depend on a PDCCH zone. Namely, the DMRS may not be located on a symbol bearing a PDCCH. The DMRS may occupy a preset number of symbols, such as a maximal number of symbols bearing the PDCCH. Namely, the DMRS may not be located on the maximal number of symbols bearing the PDCCH. For example, for a system bandwidth greater than 10 PRBs, a maximal number of 3 symbols may bear the PDCCH. Accordingly, the DMRS may occupy a 4th symbol and a symbol thereafter. Alternatively, the DMRS may be designed according to a number of symbols that actually bear the PDCCH. For example, 1 symbol may actually bear the PDCCH. Accordingly, the DMRS may occupy a 2nd symbol and a symbol thereafter.

Likewise, there may be three modes.

Figure 8:
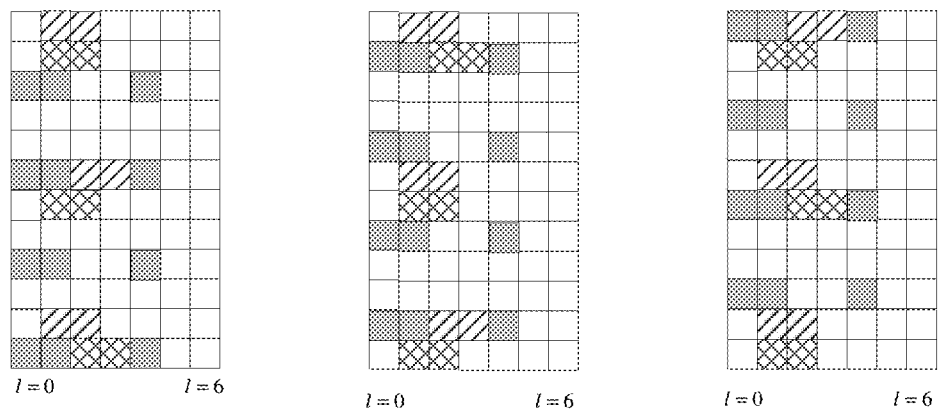
FIG. 8 is a diagram of a location in the time domain being a symbol with a minimal index beyond a Resource Element (RE) bearing a CRS and beyond a symbol bearing a Physical Downlink Control Channel (PDCCH) or a preset number of symbols according to an embodiment herein.

In a mode, the location of the DMRS in the frequency domain may remain the same as that in related art. The DMRS may be located, in the time domain, on a symbol with a minimal index beyond an RE bearing the CRS and beyond a symbol bearing the PDCCH or a preset number of symbols. A number of symbols bearing the PDCCH may be the maximal number of symbols bearing the PDCCH. Alternatively, the number of symbols bearing the PDCCH may be the number of symbols that actually bear the PDCCH. FIG. 8 is a diagram of a location in the time domain being a symbol with a minimal index beyond a Resource Element (RE) bearing a CRS and beyond a symbol bearing a Physical Downlink Control Channel (PDCCH) or a preset number of symbols according to an embodiment herein. As shown in FIG. 8, for the normal CP, the CRS may be sent at the port 4 of the antenna. A number of 1 symbol may bear the PDCCH. In FIG. 8, the DMRS may be located on a symbol beyond the symbol that actually bears the PDCCH.

The location of the time-frequency resource of the DMRS may be determined according to a maximal port number of the antenna. Alternatively, the location of the time-frequency resource of the DMRS may be determined according to the real port number of the antenna for the CRS.

Expression with mathematical formulas in this case may be done in a way analogous to that with the odd time slot, only that now the DMRS may be located on a symbol following the preset number of symbols or following the symbol bearing the PDCCH.

In a mode, the location of the DMRS in the frequency domain may remain the same as that in related art. The DMRS may be moved in the time domain onto a symbol bearing no CRS, beyond a symbol bearing the PDCCH or a preset number of symbols. A number of symbols bearing the PDCCH may be the maximal number of symbols bearing the PDCCH. Alternatively, the number of symbols bearing the PDCCH may be the number of symbols that actually bear the PDCCH.

The location of the time-frequency resource of the DMRS may be determined according to a maximal port number of the antenna. Alternatively, the location of the time-frequency resource of the DMRS may be determined according to the real port number of the antenna for the CRS.

In a mode, the DMRS in related art may be moved onto two foremost symbols, beyond a symbol bearing the PDCCH or a preset number of symbols, with a changed location of the DMRS in the frequency domain. A number of symbols bearing the PDCCH may be the maximal number of symbols bearing the PDCCH. Alternatively, the number of symbols bearing the PDCCH may be the number of symbols that actually bear the PDCCH. As the location of the time-frequency resource of the CRS is determined according to an identification (ID) of a cell, the location of the frequency resource of the DMRS may be determined according to the ID of the cell as well.

DMRS configuration in the odd time slot and in the even time slot may be identical. The DMRS configuration in both the odd time slot and the even time slot may be determined according to a mode of the even time slot.

Embodiment 2

According to an embodiment herein, a DMRS design for a TTI of 3 or 4 symbols may be provided.

Figure 9:
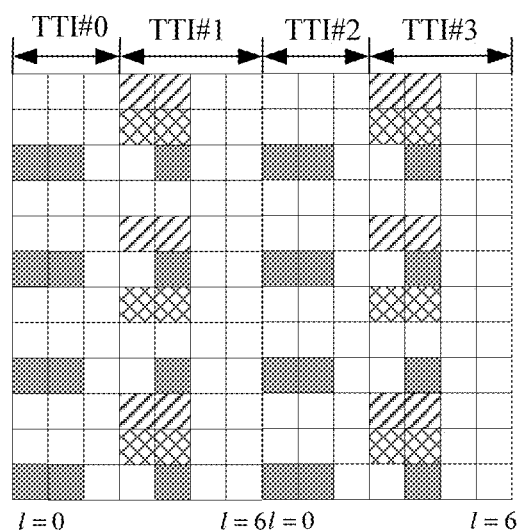
FIG. 9 is a diagram of a definition of a Transmission Time Interval (TTI) according to an embodiment herein.

FIG. 9 is a diagram of a definition of a Transmission Time Interval (TTI) according to an embodiment herein. The method according to an embodiment herein may apply, but is not limited to, the definition of the TTI.

The DMRS may be located in a TTI 1 and a TTI 3. In the TTI 1 and the TTI 3, the location of the time-frequency resource occupied by the DMRS may be determined in a mode similar to the three modes in Embodiment 1, as shown in FIG. 9. In FIG. 9, symbols with indices 3, 4, and 5 may be occupied in both the TTI 1 and the TTI 3. Similar to the mode 3 in Embodiment 1, the DMRS may occupy two foremost symbols in a TTI in the time domain. The DMRS may occupy a carrier bearing no CRS in the frequency domain.

The TTI 1 may differ from the TTI 3 in that the TTI 1 may depend on the number of symbols bearing the PDCCH. When a first symbol of the TTI 1 bears the PDCCH, the DMRS may have to be located on a symbol beyond the symbol bearing the PDCCH in the time domain, similar to the case with the even time slot.

FIG. 9 gives an example of the DMRS with a mode similar to the mode 3 according to an embodiment herein.

For a TTI 0 and a TTI 2, demodulation may be done using the CRS. For the TTI 1 and the TTI 3, demodulation may be done using the DMRS, or using the CRS of the TTI 0 and the TTI 2, respectively.

The DMRS may be placed in a location in the TTI 1 that differs from that in the TTI 3.

With the method here, no overhead is increased for the DMRS. It is guaranteed that each TTI contains a reference signal for demodulation. Application may go beyond an example herein. Each TTI may contain a DMRS. The location of the DMRS may be determined according to the three modes in Embodiment 1.

Embodiment 3

According to an embodiment herein, a DMRS design for a TTI of 2 or 3 symbols may be provided.

Figure 10:
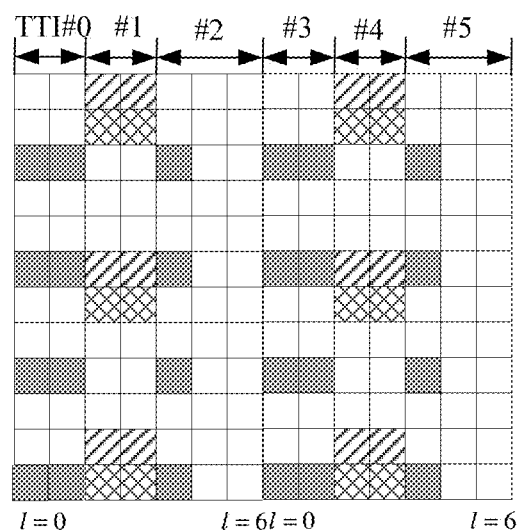
FIG. 10 is a diagram of a definition of a TTI according to an embodiment herein.

FIG. 10 is a diagram of a definition of a TTI according to an embodiment herein. As shown in FIG. 10, a time slot may be divided into 3 TTIs. The TTIs in FIG. 10 may have a number of symbols of 2, 2, 3. Alternatively, the TTIs in FIG. 10 may have a number of symbols of 3, 2, 2. Alternatively, the TTIs in FIG. 10 may have a number of symbols of 2, 3, 2. The method according to an embodiment herein may apply, but is not limited to, the definition of the TTI. In FIG. 10, the CRS may be sent at a port 4 of the antenna. Assume that the PDCCH occupies but two foremost symbols.

Figure 11:
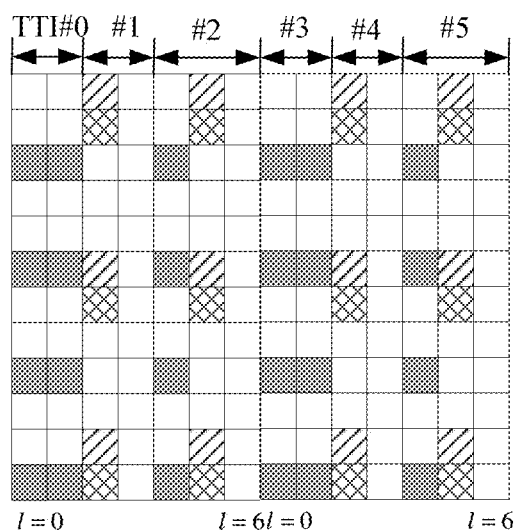
FIG. 11 is a diagram of a definition of a TTI according to an embodiment herein.

A benefit of dividing a time slot into TTIs lies in that the CRS may be identical in each time slot. The location of the CRS in the TTIs may be fixed. The location of the DMRS in a TTI may be determined according to the three modes in Embodiment 1. FIG. 11 is a diagram of a definition of a TTI according to an embodiment herein.

In FIG. 10, the DMRS may be located in the TTI 1 and the TTI 4. For the TTIs 0, 2, 3, and 5, demodulation may be done using the CRS. For the TTIs 1 and 4, demodulation may be done using the DMRS. In FIG. 11, the DMRS may be located in the TTIs 1, 2, 4, and 5. For the TTIs 0 and 3, demodulation may be done using the CRS. For the TTIs 1, 2, 4, and 5, demodulation may be done using the CRS/DMRS.

Compared to LTE in related art, with the method here, no overhead is increased for the DMRS. Application may go beyond an example herein. Each TTI may contain a DMRS. The location of the DMRS may be determined according to the three modes in Embodiment 1.

Embodiment 4

According to an embodiment herein, a DMRS design for a TTI of 1 symbol may be provided.

Figure 12:
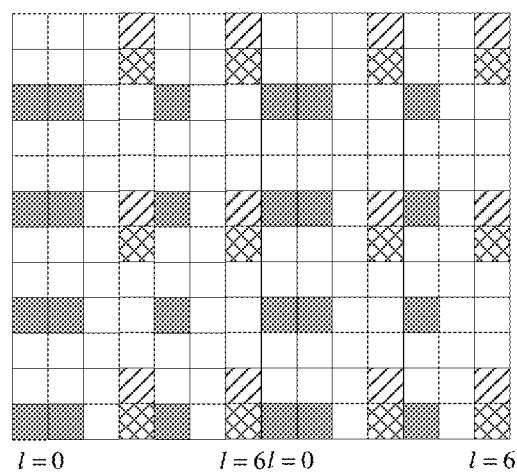
FIG. 12 is a diagram of a design of a DMRS according to an embodiment herein.

FIG. 12 is a diagram of a design of a DMRS according to an embodiment herein. As shown in FIG. 12, symbols 0, 1, 4, 7, 8, and 11 may bear the CRS. Demodulation may be done using the CRS.

Symbols 3, 6, 10, and 13 may bear the DMRS. Demodulation may be done using the DMRS.

Symbols 2, 5, 9, and 12 may bear neither the CRS nor the DMRS. Demodulation may be done using the CRS of a previous symbol.

Compared to LTE in related art, with the method here, no overhead is increased for the DMRS. Application may go beyond an example herein. Each TTI may contain a DMRS. The location of the DMRS may be determined according to the three modes in Embodiment 1.

Embodiment 5

There may be a conflict between locations of the DMRS and of another reference signal configured in the system.

Risk of conflict may be minimized by Evolved NodeB (eNB) configuration. For a Channel-State Information reference signal (CSI-RS) sent over a full bandwidth with a location that possibly conflicts with the location of the time-frequency resource of the DMRS, an eNB may avoid scheduling UE using demodulation with the DMRS. Alternatively, the eNB may puncture a conflicting RE to remove the DMRS or the CSI-RS.

The DMRS may be sent to UE on a PRB beyond a bandwidth of a Positioning Reference Signal (PRS). Alternatively in case of a conflict, the eNB may puncture a conflicting RE to remove the DMRS or the PRS.

Embodiment 6

Figure 13:
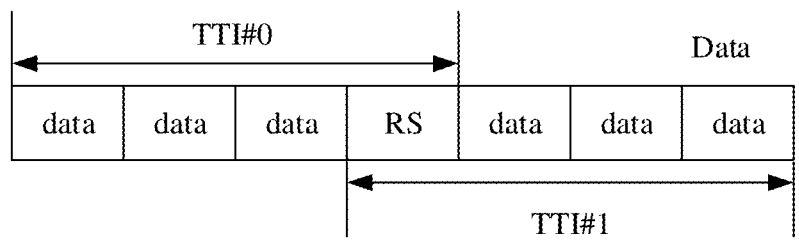
FIG. 13 is a diagram of a definition of a TTI according to an embodiment herein.

A TTI of 4 Single-Carrier Frequency-Division Multiple Access (SC-FDMA) symbols may be defined for an uplink. FIG. 13 is a diagram of a definition of a TTI according to an embodiment herein. As shown in FIG. 13, a time slot in the uplink may be divided into two TTIs 0 and 1. A symbol in one of the TTIs 0 and 1 may be adjacent to the other TTI. The DMRS for both TTIs may be located on the symbol.

Two UE DMRSs in the TTIs 0 and 1 may be made orthogonal to each other by predefinition or configuration, avoiding interference between the DMRSs in the two TTIs. For example, $$n_{cs} = (n_{DMRS}^{(1)} + n_{DMRS}^{(2)} + n_{PRS}(n_s)) \mod 12$$

where the $n_{DMRS}^{(2)}$ may be a cyclic shift indicated in Downlink Control Information (DCI). The DMRS in the two TTIs may be made orthogonal to each other.

Accordingly, no overhead is increased for the DMRS, compared to a design of a DMRS in the uplink in LTE in related art.

To allow RS orthogonality, a Physical Uplink Shared Channel (PUSCH) of UE scheduled in the neighbor TTIs 0 and 1 may have to occupy an identical resource.

Placing the DMRS at the end of the TTI 0 may impact a processing delay. Given a relatively large processing capacity of the eNB, the impact may be ignored.

FIG. 13 may apply to the normal CP. For the extended CP, there may be 6 OFDM symbols in a time slot in the uplink. The time slot in the uplink may be divided into two TTIs 0 and 1. The TTI 0 may contain the 3 foremost symbols. The TTI 1 may contain the last 4 symbols. Alternatively, the TTI 0 may contain the 4 foremost symbols. The TTI 1 may contain the last 3 symbols. The DMRS may be sent on the center symbol in the time slot.

Embodiment 7

In a system with a short TTI, a granularity for frequency resource allocation for UE may increase. There may be more than 12 subcarriers in the frequency domain, that is, 12×k subcarriers. The k may be an integer greater than 1. The k may take on a value of 1, 2, 3, 4, 5, etc.

For example, for a system with a TTI of 0.5 ms, a granularity for frequency resource allocation may be 24 subcarriers. That is, resources of multiples of 24 subcarriers in the frequency domain and 0.5 ms in the time domain may be allocated to UE. For a system with a TTI of 3 or 4 symbols, a granularity for frequency resource allocation may be 4×12=48 subcarriers. For a system with a TTI of 2 or 3 symbols, a granularity for frequency resource allocation may be 6×12=72 subcarriers. For a system with a TTI of 1 symbol, a granularity for frequency resource allocation may be 12×12=144 subcarriers. Application may go beyond an example herein as needed.

The granularity for frequency resource allocation may vary over time. For example, for a system with a TTI of 0.5 ms, a granularity for frequency resource allocation in the odd time slot may be 12 subcarriers. A granularity for frequency resource allocation in the even time slot may be 24 subcarriers. Alternatively, the granularity for frequency resource allocation may depend on the size of the TTI. For example, in case of a TTI of 3 or 4 symbols as in Embodiment 2, the granularity for frequency resource allocation may be 4×12 subcarriers for a TTI of 3 symbols. The granularity for frequency resource allocation may be 3×12 subcarriers for a TTI of 4 symbols.

UE may be configured with the granularity for frequency resource allocation by the eNB.

In case the granularity for frequency resource allocation increases, on a symbol containing a reference signal, 12 RE contained in a PRB may contain an RS density in the frequency domain same as that in related art. That is, 3 or 4 REs may be used for RS transmission. The density may be less. For example, 1 or 2 REs out of the 12 RE may be used for RS transmission.

As the TTI becomes shorter, inter-UE DMRS multiplexing by spectrum spreading in the time domain according to related art may no longer apply. Instead, spectrum spreading may be down in the frequency domain. The RS density in the frequency domain may be 2 or 4. 2 or 4 consecutive REs in the frequency domain may be occupied. Spectrum spreading for DMRSs of different UE may be done (i.e., performed) among 2 or 4 REs in the frequency domain.

An RS may have to occupy an RE bearing no existing CSI-RS, to avoid a conflict with an existing CSI-RS.

Embodiment 8

The DMRS sent to UE using demodulation with the CRS may share the port of the CRS, further increasing a density at a port of the CRS, such as in case of a high rate or a poor channel.

A computer-readable storage medium according to an embodiment herein is provided. The storage medium may have stored therein instructions that when executed by a processor, cause the processor to perform steps as follows.

In step S1, a location of a time-frequency resource for sending a reference signal in a Transmission Time Interval (TTI) is determined according to a preset mode.

In step S2, the reference signal is sent according to the location of the time-frequency resource.

Refer to an example illustrated in an aforementioned embodiment herein for an example according to the embodiment, which is not repeated here.

Clearly, those skilled in the art will know that modules or steps in embodiments herein may be realized using a universal computing device, and may be integrated in a single computing device or distributed in a network formed by multiple computing devices. Optionally, they may be realized using computing device executable program codes, and thus may be stored in a storage device and executed by a computing device. In some cases, the steps may be executed in an order different from that illustrated or described here, or may each be made into an Integrated Circuit module. Multiple modules or steps herein may be realized by being made into a single Integrated Circuit module. Thus, an embodiment herein is not limited to a specific combination of hardware and software.

INDUSTRIAL APPLICABILITY

With at least one embodiment herein, in sending a reference signal, a location of a time-frequency resource for sending the reference signal in a TTI is determined according to a preset mode. The reference signal is sent according to the location of the time-frequency resource. Accordingly, a location of the DMRS may be altered, lowering a processing delay for UE, avoiding a major processing delay for UE caused by a DMRS being located further back or lagging behind in related art.

The invention claimed is:

1. A method for sending a reference signal, comprising:
determining, according to a preset mode, a location of a time-frequency resource for sending a reference signal in a Transmission Time Interval (TTI); and
sending the reference signal according to the location of the time-frequency resource;
wherein the determining, according to a preset mode, a location of a time-frequency resource for sending a reference signal in a TTI comprises:
determining that the reference signal corresponds to one or more symbols meeting a first preset condition in the TTI, and that the reference signal corresponds to a subcarrier on the one or more symbols that is determined according to at least one of the following: a port of an antenna sending a Cell-specific Reference Signal (CRS) or an identification of a cell,
wherein the first preset condition comprises:
an index n of the one or more symbols being no less than an integer m that is no less than zero, m being a number of symbols occupied by a Physical Downlink Control Channel (PDCCH) or a preset number of symbols, the index of the one or more symbols being an index of a symbol in a time slot, $n \in \{0, 1, 2, 3, 4, 5, 6\}$ for a normal Cyclic Prefix (CP), and $n \in \{0, 1, 2, 3, 4, 5, 6\}$ for an extended CP.

2. The method according to claim 1,
wherein the reference signal corresponds to a subcarrier that is preset,
wherein the reference signal corresponds to one or more symbols meeting a second preset condition in the TTI on the subcarrier,
wherein the second preset condition comprises at least one of:
the one or more symbols being determined according to at least one of the following: the port of an antenna sending the CRS or the identification of a cell; or
an index n of the one or more symbols being no less than an integer m that is no less than zero, m being the number of symbols occupied by the PDCCH or the preset number of symbols, the index of the one or more symbols being the index of the symbol in the time slot, $n \in \{0, 1, 2, 3, 4, 5, 6\}$ for a normal CP, $n \in \{0, 1, 2, 3, 4, 5\}$ for the extended CP.

3. The method according to claim 2,
wherein the reference signal corresponds to the subcarrier with an index $k \in \{0, 1, 5, 6, 10, 11\}$ in a Physical Resource Block (PRB),
wherein the one or more symbols on the subcarrier are determined according to at least one of the port of the antenna sending the CRS or the identification of the cell by at least one of the following manners:

for $n_{ID}^{cell}$ mod 3=0, and $n_{ID}^{cell}$ being an identification of the cell in a physical layer, for p=0, or p=0 and p=1, and p being the port of the antenna sending the CRS, determining that the reference signal corresponds to the index n∈{0, 1, 2, 3, 4, 5, 6} on the subcarrier with the index k∈{1, 5, 10, 11} corresponding to the reference signal; determining that the reference signal corresponds to the index n∈{1, 2, 3, 5, 6} on the subcarrier with the index k∈{0, 6} corresponding to the reference signal;

for p=0, p=1, p=2, and p=3, and p being the port of the antenna sending the CRS, determining that the reference signal corresponds to the index n∈{0, 1, 2, 3, 4, 5, 6} on the subcarrier with the index k∈{1, 5, 10, 11} corresponding to the reference signal; determining that the reference signal corresponds to the index n∈{2, 3, 5, 6} on the subcarrier with the index k∈{0, 6} corresponding to the reference signal;

or for $n_{ID}^{cell}$ mod 3=1, for p=0, and p being the port of the antenna sending the CRS, determining that the reference signal corresponds to the index n∈{0, 1, 2, 3, 4, 5, 6} on the subcarrier with the index k∈{0, 5, 6, 10, 11} corresponding to the reference signal; determining that the reference signal corresponds to the index n∈{1, 2, 3, 5, 6} on the subcarrier with the index k∈{1} corresponding to the reference signal;

for p=0 and p=1, and p being the port of the antenna sending the CRS, determining that the reference signal corresponds to the index n∈{0, 1, 2, 3, 4, 5, 6} on the subcarrier with the index k∈{0, 5, 6, 11} corresponding to the reference signal; determining that the reference signal corresponds to the index n∈{1, 2, 3, 5, 6} on the subcarrier with the index k∈{1, 10} corresponding to the reference signal;

for p=0, p=1, p=2, and p=3, and p being the port of the antenna sending the CRS, determining that the reference signal corresponds to the index n∈{0, 1, 2, 3, 4, 5, 6} on the subcarrier with the index k∈{0, 5, 6, 11} corresponding to the reference signal; determining that the reference signal corresponds to the index n∈{2, 3, 5, 6} on the subcarrier with the index k∈{1, 10} corresponding to the reference signal;

or for $n_{ID}^{cell}$ mod 3=2, for p=0, and p being the port of the antenna sending the CRS, determining that the reference signal corresponds to the index n∈{0, 1, 2, 3, 4, 5, 6} on the subcarrier with the index k∈{0, 1, 5, 6, 10, 11} corresponding to the reference signal;

for p=0 and p=1, and p being the port of the antenna sending the CRS, determining that the reference signal corresponds to the index n∈{0, 1, 2, 3, 4, 5, 6} on the subcarrier with the index k∈{0, 1, 6, 10} corresponding to the reference signal; determining that the reference signal corresponds to the index n∈{1, 2, 3, 5, 6} on the subcarrier with the index k∈{5, 11} corresponding to the reference signal;

for p=0, p=1, p=2, and p=3, and p being the port of the antenna sending the CRS, determining that the reference signal corresponds to the index n∈{0, 1, 2, 3, 4, 5, 6} on the subcarrier with the index k∈{0, 1, 6, 10} corresponding to the reference signal; determining that the reference signal corresponds to the index n∈{2, 3, 5, 6} on the subcarrier with the index k∈{5, 11} corresponding to the reference signal, wherein subcarriers in a PRB are given indices 0 to 11 in ascending frequencies.

4. The method according to claim 2,
wherein the reference signal corresponds to the subcarrier with an index k∈{1, 4, 7, 10},
wherein the one or more symbols on the subcarrier are determined according to at least one of the port of the antenna sending the CRS or the identification of the cell by at least one of the following manners:

for $n_{ID}^{cell}$ mod 3=0 or $n_{ID}^{cell}$ mod 3=2, and $n_{ID}^{cell}$ being an identification of the cell in a physical layer,
determining that the subcarrier with the index k∈{1, 4, 7, 10} corresponds to the index n∈{0, 1, 2, 3, 4, 5};

or for $n_{ID}^{cell}$ mod 3=1, for p=0, and p being the port of the antenna sending the CRS, determining that the reference signal corresponds to the index n∈{1, 2, 4, 5} on the subcarrier with the index k∈{1, 7} corresponding to the reference signal; determining that the reference signal corresponds to the index n∈{0, 1, 2, 3, 4, 5} on the subcarrier with the index k∈{4, 10} corresponding to the reference signal;

for p=0 and p=1, and p being the port of the antenna sending the CRS, determining that the reference signal corresponds to the index n∈{1, 2, 4, 5} on the subcarrier with the index k∈{1, 4, 7, 10} corresponding to the reference signal;

for p=0, p=1, p=2, and p=3, and p being the port of the antenna sending the CRS, determining that the reference signal corresponds to the index n∈{2, 4, 5} on the subcarrier with the index k∈{1, 4, 7, 10} corresponding to the reference signal.

5. The method according to claim 2,
wherein the reference signal corresponds to the subcarrier with an index k∈{2, 5, 8, 11},
wherein the one or more symbols on the subcarrier are determined according to at least one of the port of the antenna sending the CRS or the identification of the cell by at least one of the following manners:

for $n_{ID}^{cell}$ mod 3=0 or $n_{ID}^{cell}$ mod 3=1, and $n_{ID}^{cell}$ being an identification of the cell in a physical layer,
determining that the reference signal corresponds to the index n∈{0, 1, 2, 3, 4, 5} on the subcarrier with the index k∈{2, 5, 8, 11} corresponding to the reference signal, or for $n_{ID}^{cell}$ mod 3=2, for p=0, and p being the port of the antenna sending the CRS, determining that the reference signal corresponds to the index n∈{1, 2, 4, 5} on the subcarrier with the index k∈{2, 8} corresponding to the reference signal; determining that the reference signal corresponds to the index n∈{0, 1, 2, 3, 4, 5} on the subcarrier with the index k∈{4, 10} corresponding to the reference signal;

for p=0 and p=1, and p being the port of the antenna sending the CRS, determining that the reference signal corresponds to the index n∈{1, 2, 4, 5} on the subcarrier with the index k∈{2, 5, 8, 11} corresponding to the reference signal;

for p=0, p=1, p=2, and p=3, and p being the port of the antenna sending the CRS, determining that the reference signal corresponds to the index n∈{2, 4, 5} on the subcarrier with the index k∈{2, 5, 8, 11} corresponding to the reference signal.

6. The method according to claim 2, wherein the reference signal corresponds to one or more symbols with minimal indices meeting the second preset condition in the TTI.

7. The method according to claim 1, wherein the subcarrier corresponding to the reference signal is determined according to at least one of the port of the antenna sending the CRS or the identification of the cell by at least one of the following manners:

for $n_{ID}^{cell}$ mod 3=0, and $n_{ID}^{cell}$ being an identification of the cell in a physical layer, for p=0, and p being the port of the antenna sending the CRS, determining that the reference signal corresponds to the subcarrier with an index k E {1, 2, 3, 4, 5, 7, 8, 9, 10, 11};

for p=0 and p=1, or p=0, p=1, p=2, and p=3, and p being the port of the antenna sending the CRS, determining that the reference signal corresponds to the subcarrier with the index k∈{1, 2, 4, 5, 7, 8, 10, 11} in a Physical Resource Block (PRB);

or for $n_{ID}^{cell}$ mod 3=1, for p=0, and p being the port of the antenna sending the CRS, determining that the reference signal corresponds to the subcarrier with the index k∈{0, 2, 3, 4, 5, 6, 8, 9, 10, 11};

for p=0 and p=1, or p=0, p=1, p=2, and p=3, and p being the port of the antenna sending the CRS, determining that the reference signal corresponds to the subcarrier with the index k∈{0, 2, 3, 5, 6, 8, 9, 11};

or for $n_{ID}^{cell}$ mod 3=2, for p=0, and p being the port of the antenna sending the CRS, determining that the reference signal corresponds to the subcarrier with the index k∈{0, 1, 3, 4, 5, 6, 7, 9, 10, 11};

for p=0 and p=1, or p=0, p=1, p=2, and p=3, and p being the port of the antenna sending the CRS, determining that the reference signal corresponds to the subcarrier with the index k∈{0, 1, 3, 4, 6, 7, 9, 10}, wherein subcarriers in a PRB are given indices 0 to 11 in ascending frequencies.

8. The method according to claim 1, wherein the determining that the reference signal corresponds to one or more symbols meeting a first preset condition in the TTI comprises:

determining that the reference signal corresponds to one or more symbols with minimal indices meeting the first preset condition in the TTI.

9. The method according to claim 1, wherein in the TTI, the time-frequency resource corresponds to a symbol with an index n∈{2, 3, 5, 6} for a normal Cyclic Prefix (CP), the time-frequency resource corresponds to the symbol with the index n∈{2, 4, 5} for an extended CP.

10. The method according to claim 9, wherein the reference signal corresponds to one or more symbols with minimal indices in the TTI.

11. The method according to claim 1, wherein for the TTI of a duration of a time slot, for a normal Cyclic Prefix (CP), the time-frequency resource corresponds to a symbol with an index n∈{2, 3}, and a subcarrier with an index k∈{0, 1, 5, 6, 10, 11} in a Physical Resource Block (PRB), wherein symbols in the TTI are given indices 0, 1, 2, 3, 4, 5, and 6, wherein subcarriers in a PRB are given indices 0 to 11 in ascending frequencies.

12. The method according to claim 1, wherein a TTI is adjacent to one or more symbols in a neighbor TTI.

13. The method according to claim 12, wherein the one or more symbols in the neighbor TTI comprise the reference signal.

14. The method according to claim 1, wherein frequency resource allocation in the TTI is done at a granularity of 12×y subcarriers, wherein y is an integer greater than 1.

15. The method according to claim 1, wherein the reference signal occupies 1, 2, 3, or 4 of 12 Resource Elements (RE) comprised in a Physical Resource Block (PRB) on a symbol comprising the reference signal.

16. The method according to claim 15, wherein the reference signal occupies REs that are consecutive in a frequency domain.

17. A method for receiving a reference signal, comprising:

receiving, by User Equipment (UE), a reference signal sent by a Base Station (BS), wherein a location of a time-frequency resource for sending the reference signal in a Transmission Time Interval (TTI) is determined according to a preset mode;

wherein the location of a time-frequency resource for sending the reference signal in a TTI is determined according to a preset mode by:

determining that the reference signal corresponds to one or more symbols meeting a first preset condition in the TTI, and that the reference signal corresponds to a subcarrier on the one or more symbols that is determined according to at least one of the following: a port of an antenna sending a Cell-specific Reference Signal (CRS) or an identification of a cell, wherein the first preset condition comprises:

an index n of the one or more symbols being no less than an integer m that is no less than zero, m being a number of symbols occupied by a Physical Downlink Control Channel (PDCCH) or a preset number of symbols, the index of the one or more symbols being an index of a symbol in a time slot, n∈{0, 1, 2, 3, 4, 5, 6} for a normal Cyclic Prefix (CP), and n∈{0, 1, 2, 3, 4, 5, 6} for an extended CP.

18. A device for sending a reference signal, applying to a Base Station (BS), the device comprising:

a processor; and memory storing instructions executable by the processor for:

determining, according to a preset mode, a location of a time-frequency resource for sending a reference signal in a Transmission Time Interval (TTI); and sending the reference signal according to the location of the time-frequency resource;

wherein the determining, according to a preset mode, a location of a time-frequency resource for sending a reference signal in a TTI comprises:

determining that the reference signal corresponds to one or more symbols meeting a first preset condition in the TTI, and that the reference signal corresponds to a subcarrier on the one or more symbols that is determined according to at least one of the following: a port of an antenna sending a Cell-specific Reference Signal (CRS) or an identification of a cell, wherein the first preset condition comprises:

an index n of the one or more symbols being no less than an integer m that is no less than zero, m being a number of symbols occupied by a Physical Downlink Control Channel (PDCCH) or a preset number of symbols, the index of the one or more symbols being an index of a symbol in a time slot, n∈{0, 1, 2, 3, 4, 5, 6} for a normal Cyclic Prefix (CP), and n∈{0, 1, 2, 3, 4, 5, 6} for an extended CP.

19. A device for receiving a reference signal, applying to User Equipment (UE), the device comprising:

a processor; and
- memory storing instructions executable by the processor for receiving a reference signal sent by a Base Station (BS), wherein a location of a time-frequency resource for sending the reference signal in a Transmission Time Interval (TTI) is determined according to a preset mode;
- wherein the location of a time-frequency resource for sending the reference signal in a TTI is determined according to a preset mode by:
- determining that the reference signal corresponds to one or more symbols meeting a first preset condition in the TTI, and that the reference signal corresponds to a subcarrier on the one or more symbols that is determined according to at least one of the following: a port of an antenna sending a Cell-specific Reference Signal (CRS) or an identification of a cell,
- wherein the first preset condition comprises:

an index n of the one or more symbols being no less than an integer m that is no less than zero, m being a number of symbols occupied by a Physical Downlink Control Channel (PDCCH) or a preset number of symbols, the index of the one or more symbols being an index of a symbol in a time slot, $n \in \{0, 1, 2, 3, 4, 5, 6\}$ for a normal Cyclic Prefix (CP), and $n \in \{0, 1, 2, 3, 4, 5, 6\}$ for an extended CP.

* * * * *